(12) United States Patent
Kojima et al.

(10) Patent No.: US 6,538,622 B1
(45) Date of Patent: Mar. 25, 2003

(54) DISPLAY APPARATUS ON A VEHICLE

(75) Inventors: Koichi Kojima, Hiroshima-ken (JP);
Hiroki Uemura, Hiroshima-ken (JP);
Hidekazu Sasaki, Hiroshima-ken (JP);
Ayumu Doi, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/488,113

(22) Filed: Jan. 20, 2000

(30) Foreign Application Priority Data

Jan. 26, 1999 (JP) .......................... 11-017503
Jul. 9, 1999 (JP) .......................... 11-253312

(51) Int. Cl.⁷ .................... G09G 5/00; G08G 1/00; H04N 7/18; H04N 9/47
(52) U.S. Cl. .................... 345/7; 340/901; 348/115
(58) Field of Search .............. 345/7, 8, 9; 348/115; 359/630; 340/435, 436, 438, 441, 457.2, 461, 462, 466, 471, 961, 980, 901–905

(56) References Cited

U.S. PATENT DOCUMENTS

| 5,410,304 A | | 4/1995 | Hahn et al. | |
|---|---|---|---|---|
| 5,410,346 A | * | 4/1995 | Saneyoshi et al. | 348/116 |
| 5,414,439 A | * | 5/1995 | Groves et al. | 345/7 |
| 5,461,357 A | * | 10/1995 | Yoshioka et al. | 340/435 |
| 5,627,510 A | * | 5/1997 | Yuan | 340/435 |
| 5,627,518 A | * | 5/1997 | Wishart | 340/567 |
| 5,670,935 A | * | 9/1997 | Schofield et al. | 340/461 |
| 5,764,139 A | * | 6/1998 | Nojima et al. | 340/461 |
| 5,949,331 A | * | 9/1999 | Schofield et al. | 340/461 |
| 5,963,148 A | * | 10/1999 | Sekine et al. | 340/905 |

FOREIGN PATENT DOCUMENTS

| JP | 60231193 | 11/1985 |
|---|---|---|
| JP | 6247184 | 9/1994 |
| JP | 9315225 | 12/1997 |
| JP | 10230805 | 9/1998 |

* cited by examiner

Primary Examiner—Bipin Shalwala
Assistant Examiner—Jeff Piziali
(74) Attorney, Agent, or Firm—Brooks & Kushman, P.C.

(57) ABSTRACT

When the vehicle is traveling on a motorway, a display control module of a display controller determines that an obstacle is unlikely to be present, and restricts the display pattern of a sensed image sensed of an image sensing device to be displayed on a display device. Even when the vehicle is traveling on the motorway, if no stalled vehicle is detected, the display control module displays the sensed image without restricting it, thereby supporting drive operation of the driver.

6 Claims, 22 Drawing Sheets

DISPLAY APPARATUS ON A VEHICLE

BACKGROUND OF THE INVENTION

The present invention relates to a display apparatus on a vehicle for visibly informing a passenger of the presence/absence of, e.g., obstacles or the like present around the vehicle and, for example, to a display apparatus provided on an automobile as a representative vehicle.

Conventionally, an apparatus for sensing an image of a space around a vehicle using an infrared image sensing device, and displaying the sensed image on a unit in front of the driver's seat is proposed in, e.g., Japanese Patent Laid-Open No. S60-231193, Japanese Patent Application No. H6-247184, Japanese Patent Laid-Open Nos. H9-39658, H10-230805, and the like. According to such apparatuses, the driver can easily recognize the presence of obstacles (heat sources such as people, animals, or the like that may interfere with safe maneuvering of the vehicle) even in a situation (e.g., night, heavy fog, or the like) around the vehicle that the driver can hardly recognize such obstacles even when he or she turns on head lamps, and such apparatuses can effectively support the maneuvering.

However, in such conventional apparatuses, it is a common practice to locate a display for displaying an image at a position in front of the driver seat so that it is easy for the driver to see. Since the image is always displayed on this display in an identical display pattern irrespective of the surrounding environment around the vehicle, it is expected to become a heavy load on the driver's sight.

SUMMARY OF THE INVENTION

It is, therefore, an object of the present invention to provide a display apparatus on a vehicle, which can satisfactorily display the situation around the vehicle, and can appropriately change its display pattern in correspondence with the surrounding environment.

In order to achieve the above object, a display apparatus on a vehicle according to the present invention is characterized by the following arrangement.

That is, the invention according to claim 1 is a display apparatus on a vehicle, which comprises image sensing means (2, 103) for sensing an image ahead of the vehicle using infrared rays, and display means (3A, 3B, 108) for displaying an infrared image sensed by the image sensing means at a position in front of a driver's seat in a passenger room of the vehicle, characterized by comprising surrounding environment detection means (2, 4, 6, 8, 18, 102, 104–107) for detecting a surrounding environment of the vehicle, and display control means for controlling the display means (1, 101) on the basis of a detection result of the surrounding environment detection means, and in that the display control means checks whether or not the surrounding environment detected by the surrounding environment detection means requires display of the infrared image on the display means, and when it is determined that the surrounding environment does not require display of any infrared image, display of the infrared image on the display means is suppressed compared to a case wherein it is determined that the surrounding environment requires display of the infrared image.

According to the invention of claim 1, since the situation around the vehicle can be satisfactorily displayed, and the display pattern can be appropriately changed in accordance with the surrounding environment, visual and mental loads on the drive operation of the driver can be reduced.

In the display apparatus on a vehicle according to claim 1, when it is determined as the surrounding environment that the vehicle is traveling in a surrounding environment in which a heat source that may interfere with safe maneuvering is highly likely to be present ahead of the vehicle, the display control means preferably suppresses display of the infrared image on the display means compared to a case wherein it is determined that the vehicle is traveling in a surrounding environment in which the heat source is unlikely to be present.

In the display apparatus on a vehicle according to claim 1, when it is determined as the surrounding environment that the vehicle is traveling on a motorway in an urban area, the display control means preferably suppresses display of the infrared image on the display means compared to a case wherein it is determined that the vehicle is traveling on a normal road.

Since a road such as a motorway or the like is designed to allow efficient travel of automobiles, obstacles are unlikely to be present ahead of the self vehicle, and the display pattern can be adequately restricted in such surrounding environment.

In this case, as an example of the method of suppressing display of an infrared image, when it is detected as the surrounding environment that another stalled vehicle is present ahead of the vehicle, the display control means preferably inhibits suppression of display of the infrared image on the display means.

Note that as a preferred embodiment for checking whether or not another vehicle is present, the surrounding environment detection means preferably includes obstacle detection means (4, 102) for detecting distance to an obstacle present ahead of the vehicle, and the display control means determines the presence/absence of the other stalled vehicle on the basis of a detection result of the obstacle detection means. Or the surrounding environment detection means may include road-vehicle communication means (18) for receiving information that pertains to a traveling state of another vehicle present ahead of the vehicle from a transmitter provided in a communication infrastructure on a road side, and the display control means may determine the presence/absence of the other stalled vehicle on the basis of a reception result of the road-vehicle communication means.

In the display apparatus on a vehicle according to claim 1, the display control means inhibits display of the infrared image as suppression of display of the infrared image on the display means.

As an example of the method of suppressing display of an infrared image, the apparatus preferably comprises as the display means a first display (3A) which is laid out in advance at a position within a field-of-view range of a driver who looks forward, and a second display (3B) which is laid out in advance at a position near an outer edge of the field-of-view range compared to the layout position of the first display, and the display control means stops display of the infrared image on the first display as suppression of display of the infrared image on the display means.

In this case, in a preferred embodiment, when it is determined that the surrounding environment detected by the surrounding environment detection means does not require display of any infrared image on the display means, the display control means preferably displays the infrared image only on the second display, and when it is determined that the surrounding environment requires display of the infrared image, the display control means preferably displays the infrared image only on the first display. Or when it is determined that the surrounding environment detected by the surrounding environment detection means does not require display of any infrared image on the display means, the display control means may display the infrared image only on the second display, and when it is determined that the surrounding environment requires display of the infrared image, the display control means may display the infrared image on the first and second displays.

In the display apparatus on a vehicle according to claim 1, the display control means may suppress display of the infrared image on the display means by decreasing a display luminance of the display means or by decreasing size of a display area of the display means.

In the display apparatus on a vehicle according to claim 1, when it is determined as the surrounding environment that the vehicle is traveling trailing the path of another vehicle which is traveling ahead of the vehicle so as to maintain a distance from the other vehicle at a predetermined value, the display control means suppresses display of the infrared image on the display means compared to a case wherein it is determined that the vehicle is not traveling trailing the path of the other vehicle.

In this case, as a preferred embodiment of determining whether or not the vehicle is trailing another vehicle, the surrounding environment detection means preferably includes road-vehicle communication means (18) for receiving information that pertains to a traveling state of another vehicle present ahead of the vehicle from a transmitter provided in a communication infrastructure on a road side, and the display control means determines on the basis of a reception result of the road-vehicle communication means whether or not the vehicle is trailing along behind the other vehicle.

As a preferred embodiment of suppressing display of an infrared image, when it is determined that the vehicle is traveling trailing the path of the other vehicle and the predetermined value is set to be smaller than a headlight irradiation range of the vehicle, the display control means preferably suppresses display of the infrared image on the display means compared to a case wherein the predetermined value is set to be larger than the headlight irradiation range. Or when the predetermined value is smaller than a threshold value set in accordance with a traveling velocity of the vehicle, the display control means may suppress display of the infrared image on the display means compared to a case wherein the predetermined distance is larger than the threshold value (in this case, the threshold value is preferably set to increase in accordance with increasing traveling velocity of the vehicle).

In the display apparatus on a vehicle according to claim 1, when it is detected as the surrounding environment that a pedestrian crossing is present ahead of the vehicle, the display control means suppresses display of the infrared image on the display means compared to a case wherein no pedestrian crossing is detected.

With this invention, when a pedestrian crossing is detected, since restrictions such as a reduction of the display intensity, reduced-scale display, and the like are canceled, the driver's sight can be adequately supported, and the driver can easily recognize a pedestrian who may be crossing the detected pedestrian crossing.

As a preferred embodiment of suppressing display of an infrared image, when a distance between the vehicle and the pedestrian crossing is larger than a predetermined value, the display control means preferably suppresses display of the infrared image on the display means compared to a case wherein the distance is smaller than the predetermined value (in this case, the predetermined value is preferably set to increase in accordance with increasing traveling velocity of the vehicle). Or the display control means may include a manual operation switch (113) which allows a passenger to turn on/off a control function of suppressing display of the infrared image on the display means.

In the display apparatus on a vehicle according to claim 1, when the presence of a person ahead of the vehicle is not detected as the surrounding environment, the display control means suppresses display of the infrared image on the display means compared to a case wherein the presence of a person is detected (note that the display control means preferably includes a manual operation switch (113) which allows a passenger to turn on/off a control function of suppressing display of the infrared image on the display means).

In this case, as a preferred embodiment of detecting whether or not a person is present, the surrounding environment detection means (103) preferably determines the presence of a person ahead of the vehicle when it is detected that the infrared image sensed by the image sensing means includes a heat source within a predetermined temperature range corresponding to radiation heat of a person.

Also, as a preferred embodiment of determining whether or not a heat source within a predetermined temperature range corresponding to radiation heat of a person is included, the surrounding environment detection means preferably includes at least one of temperature detection means (107) for detecting atmospheric temperature of the vehicle, and date & time detection means (105) for detecting a current date and time, and the display control means adjusts the predetermined temperature range on the basis of the atmospheric temperature detected by the temperature detection means and/or the current date and time detected by the date & time detection means as the surrounding environment.

In the display apparatus on a vehicle according to claim 1, when the presence of an on-coming vehicle is not detected as the surrounding environment, the display control means suppresses display of the infrared image on the display means compared to a case wherein the presence of an on-coming vehicle is detected (note that the display control means preferably includes a manual operation switch (113) which allows a passenger to turn on/off a control function of suppressing display of the infrared image on the display means).

In this case, as a preferred embodiment of determining whether or not an on-coming vehicle is present, the surrounding environment detection means (104) preferably detects the presence/absence of the on-coming vehicle by checking whether or not light irradiating the vehicle comes from head lamps of another vehicle.

With this invention, when light coming from the head lamps of an on-coming vehicle is detected (in such case, the driver can hardly recognize the situation of the road ahead), since restrictions such as a reduction of the display intensity, reduced-scale display, and the like are canceled, the driver's sight can be adequately supported.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A display apparatus on a vehicle according to the present invention will be described in detail hereinafter as embodiments of a display apparatus mounted on an automobile as a representative vehicle.

[First Embodiment]

Figure 1:
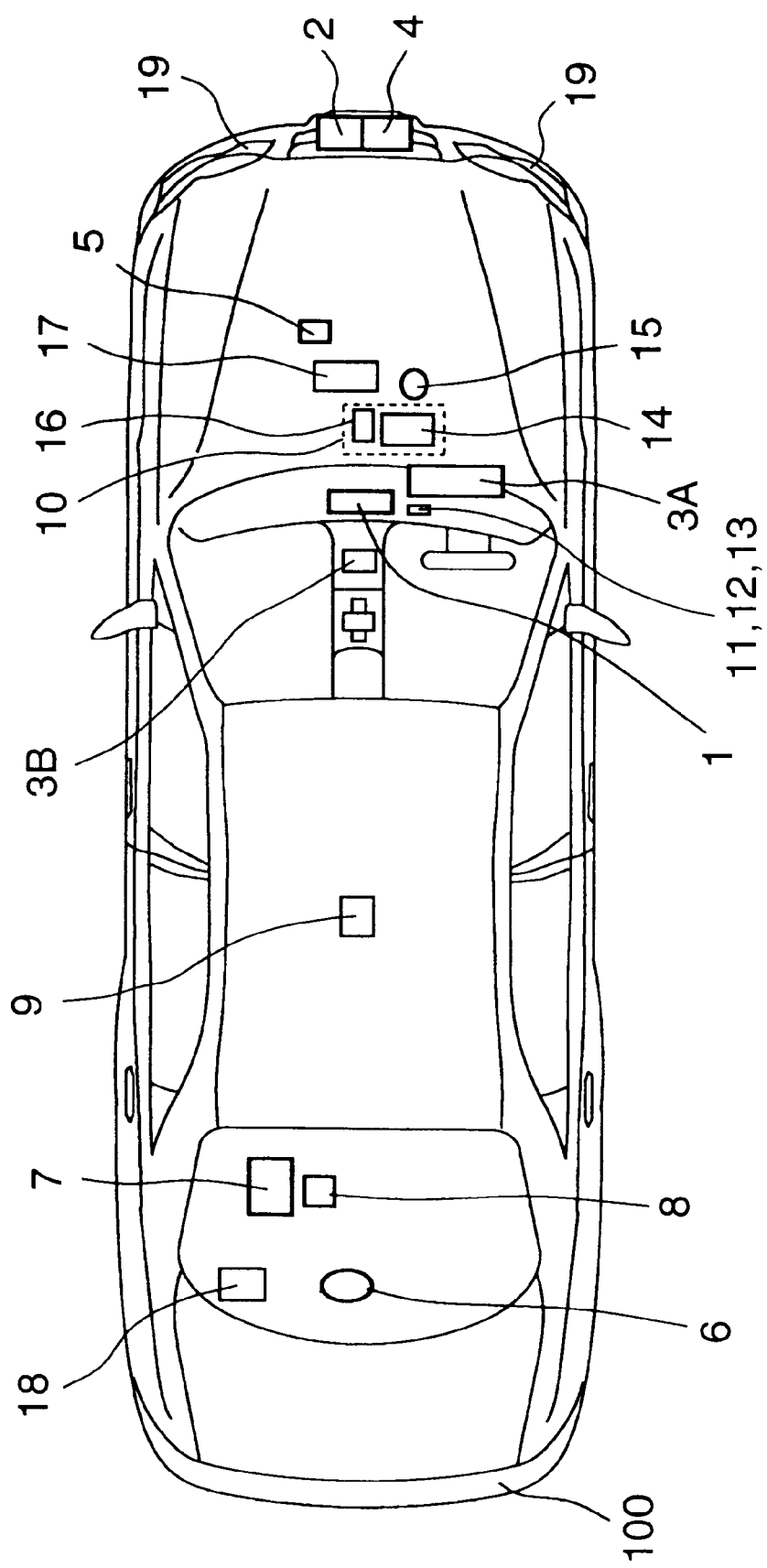
FIG. 1 is a view showing the system arrangement of a vehicle on which a display apparatus according to the first embodiment of the present invention is mounted.
Figure 2:
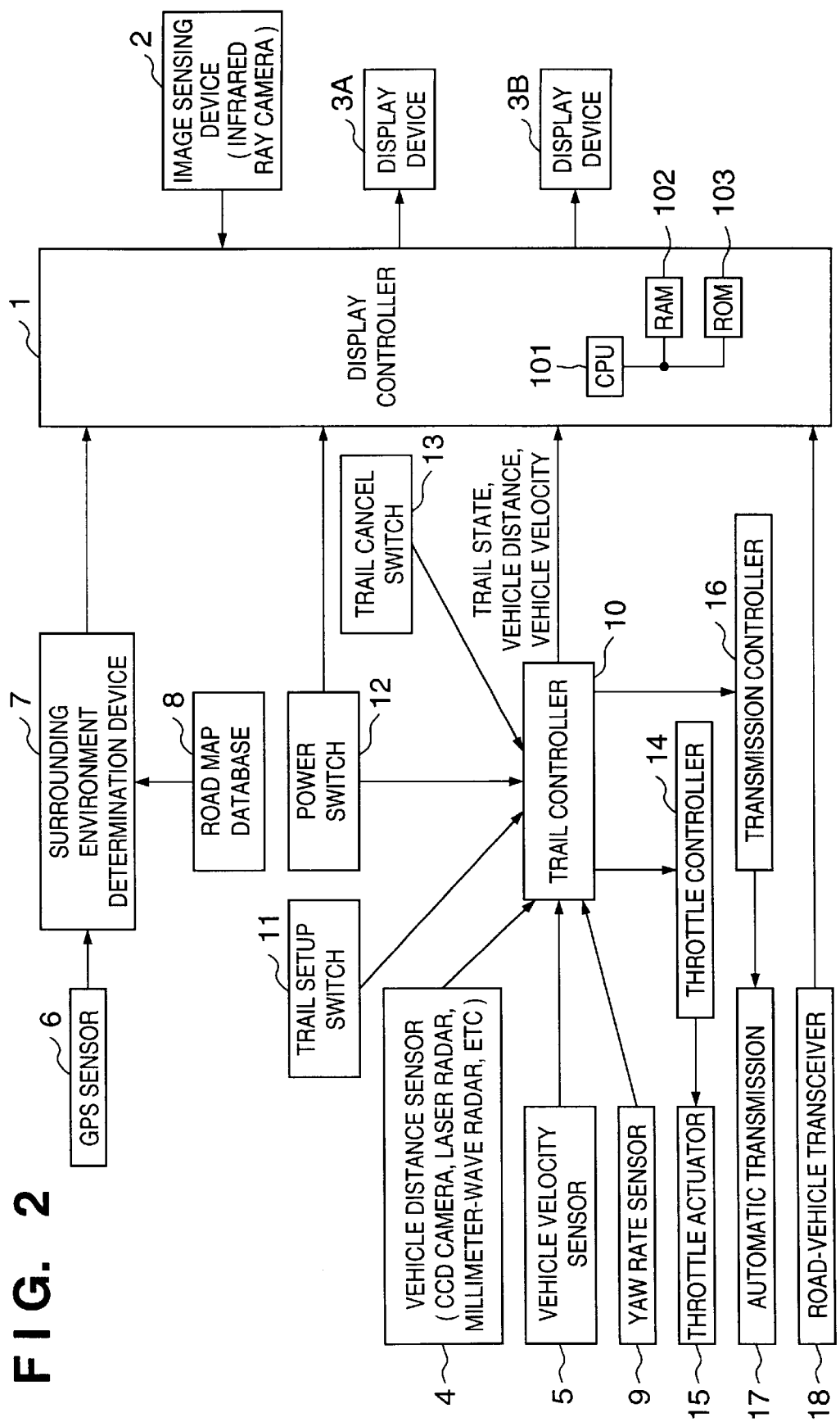
FIG. 2 is a block diagram of the display apparatus according to the first embodiment of the present invention.

FIG. 1 is a view showing the system arrangement of a vehicle on which a display apparatus according to the first embodiment of the present invention is mounted. FIG. 2 is a block diagram of the display apparatus according to the first embodiment of the present invention.

Referring to FIGS. 1 and 2, reference numeral 2 denotes an image sensing device such as an infrared ray camera or the like for sensing an image ahead of a vehicle 100 using infrared rays. Reference numerals 3A and 3B denote display devices (displays) such as liquid crystal displays, head-up displays, or the like for displaying an image (to be referred to as a sensed image hereinafter) sensed by the image sensing device 2. Note that the display device 3A is laid out at a position (e.g., the central position of a dashboard, or the like) in front of the driver seat of the vehicle 100 where the driver can easily see the displayed image without largely moving the line of sight when he or she looks forward, as shown in FIG. 1. The display device 3B is laid out in a center console which is located near the lower outer edge of the line-of-sight range (field of view) when the driver looks forward, compared to the layout position of the display device 3A (that is, the display device 3A is laid out at an upper position, compared with the layout position of the display device 3B, that allows high visibility for the driver). In this embodiment, the two display devices 3A and 3B are selectively used by a display control process (to be described later) as needed, thus appropriately changing the display pattern in accordance with the surrounding environment.

Figure 3:
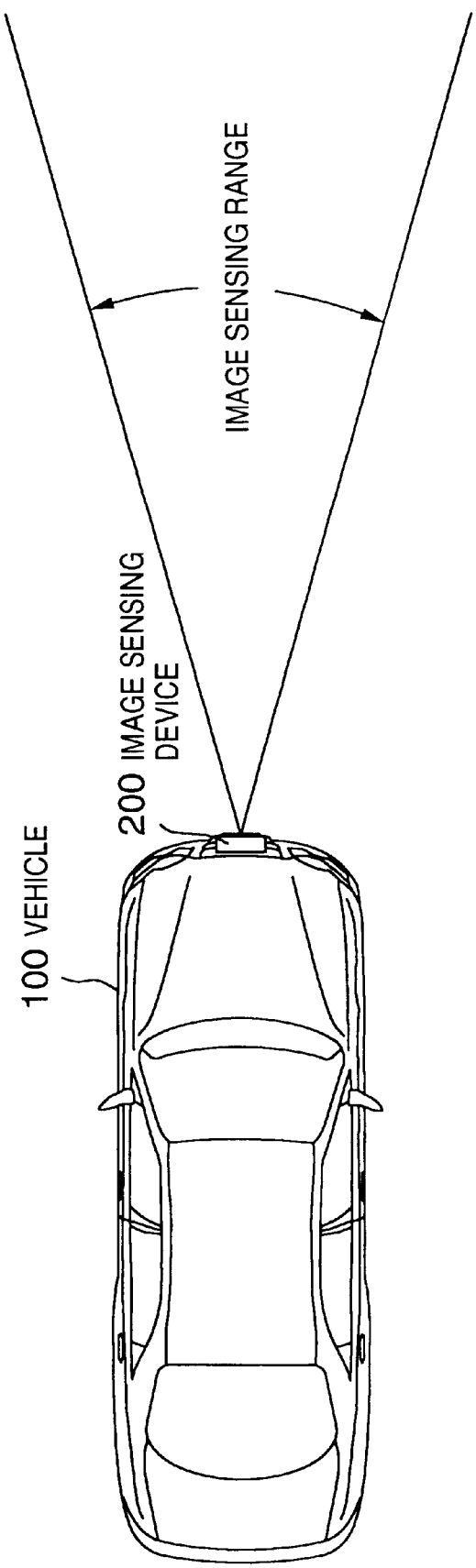
FIG. 3 shows the image sensing range of an image sensing device in the display apparatus according to the first embodiment of the present invention.
Figure 4:
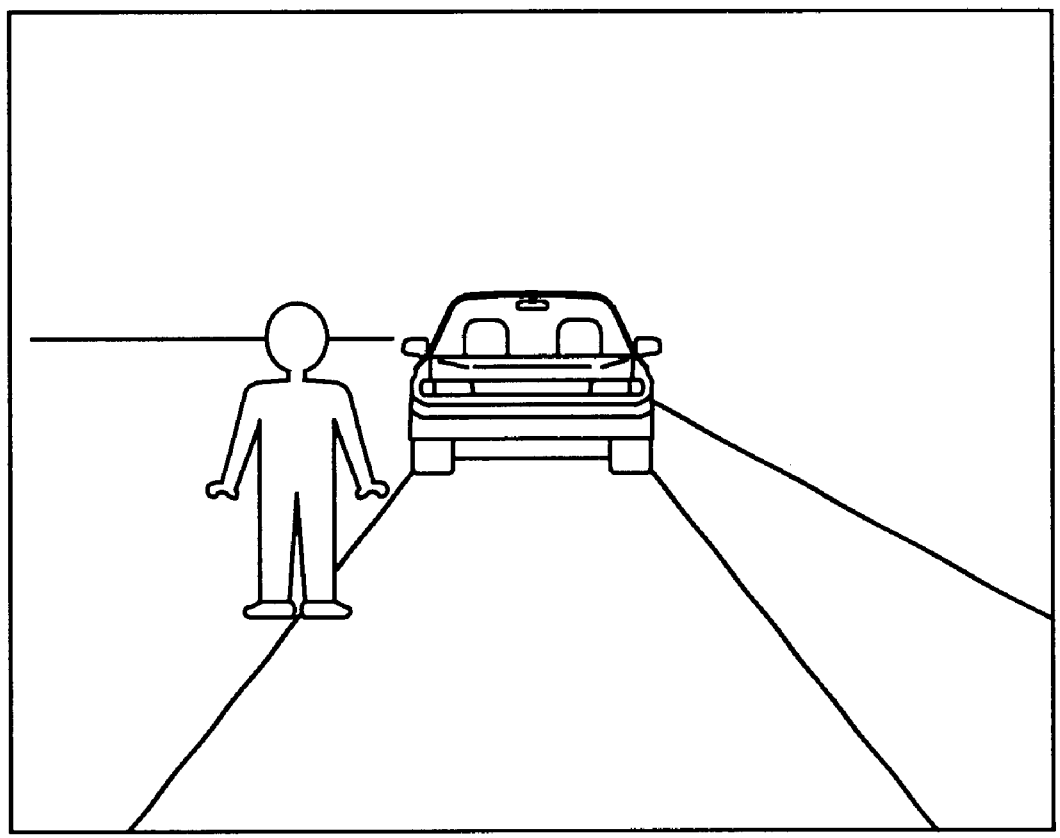
FIG. 4 shows an example of an image frame sensed by the image sensing device in the display apparatus according to the first embodiment of the present invention.

The image sensing device 2 has an image sensing range shown in, e.g., FIG. 3, and FIG. 4 shows an example of the display frame ahead of the vehicle, which is sensed by that image sensing device and is displayed on the display device 3A and/or the display device 3B.

Reference numeral 6 denotes a GPS (global positioning system) sensor for receiving a GPS signal. Reference numeral 7 denotes a surrounding environment determination device for detecting the current position of the vehicle 100 on a road map on the basis of the output signal from the GPS sensor 6 and map information (including a surrounding environment such as the type of road, and the like) acquired from a road map database 8 such as a CD-ROM reader or the like, and determining the surrounding environment around the vehicle (e.g., whether the vehicle is currently is traveling on a so-called motorway or a normal road, and so forth). The surrounding environment determination device can use, e.g., a prevalent navigation control unit.

Reference numeral 4 denotes a vehicle distance sensor for detecting a vehicle distance DA between the vehicle 100 and a lead vehicle ahead of the vehicle 100. The sensor 4 detects the vehicle distance from the lead vehicle or the distance from an obstacle ahead of the vehicle by a conventional method using a CCD camera, laser radar, millimeter-wave radar, or the like. Reference numeral 5 denotes a vehicle velocity sensor for detecting the self vehicle velocity of the vehicle 100. Reference numeral 9 denotes a prevalent yaw rate sensor for detecting the yaw rate of the vehicle 100. Reference numeral 14 denotes a throttle controller for controlling a throttle actuator 15 which controls the opening of a throttle valve of an engine (not shown). Reference numeral 16 denotes a transmission controller for controlling an automatic transmission 17. Reference numeral 10 denotes a trail controller for making the vehicle 100 trail the lead vehicle by controlling the throttle controller 14 and transmission controller 16 on the basis of the output signals from the vehicle distance sensor 5, vehicle velocity sensor 5, and yaw rate sensor 9. The trail controller 10 automatically executes trail control in accordance with the states of a power switch (main switch) 12 which initiates the control of the controller 10, a trail setup switch 11 which can set the start of trail control when the power switch 12 is ON and the vehicle distance between the vehicle 100 and the lead vehicle has a value that the driver wants, and a trail cancel switch 13 that cancels automatic trail control to the lead vehicle by driver operation (this process will be described in detail later).

Reference numeral 18 denotes a road-vehicle transceiver for receiving various kinds of information (for example, a surrounding environment such as the presence of an obstacle (e.g., a stalled vehicle, littered load, or the like) on the road ahead, information pertaining to trail indicating if the vehicle is traveling in a file while maintaining a predetermined distance to the lead vehicle, and the like) obtained from the road (communication infrastructures provided to the road) around the vehicle 100. Note that the information received by the road-vehicle transceiver is used in the third modification of the second embodiment to be described later.

A display controller 1 controls the display pattern of the sensed image from the image sensing device 2 on the display device 3A and/or the display device 3B on the basis of the determination result of the surrounding environment determination device 7 and input signals from the trail controller 10 (trail state signal to the lead vehicle, vehicle distance DA, self vehicle velocity V, and the like) (to be described in detail later). The control processes of the display controller 1 are implemented by a CPU 101 in accordance with software programs pre-stored in, e.g., a ROM 103 or the like using a RAM 102 as a work area.

The control processes done by the display controller 1 in this embodiment will be described in detail below with reference to FIGS. 5 to 7.

Figure 5:
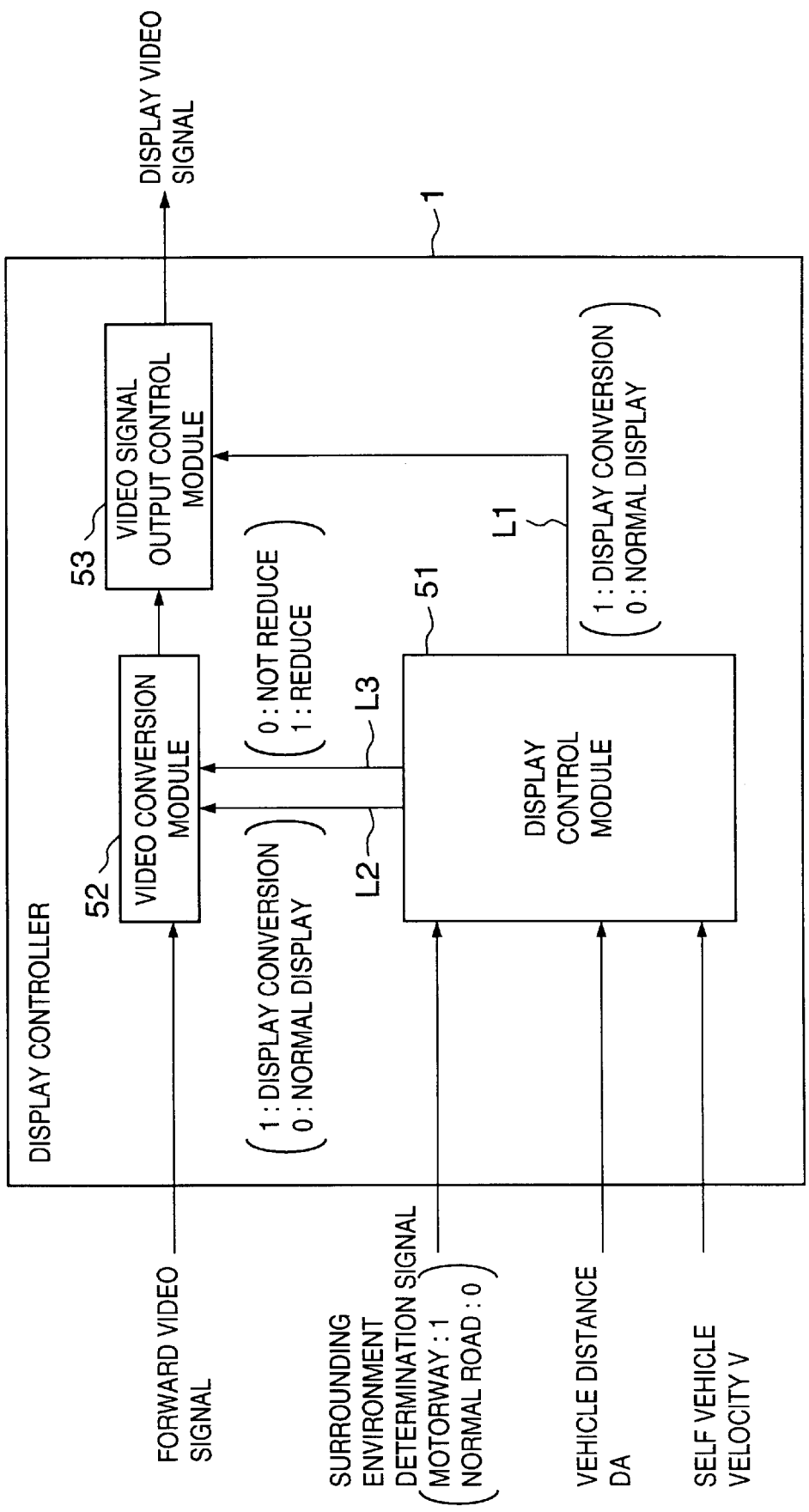
FIG. 5 is a diagram showing as functional modules the control processes done by a display controller in the first embodiment of the present invention.

FIG. 5 shows as functional modules the control processes done by the display controller in the first embodiment of the present invention.

Referring to FIG. 5, a display control module 51 determines possibility of presence of obstacles such as a stalled vehicle and the like ahead of the vehicle 100 on the basis of a surrounding environment determination signal (1: when the vehicle 100 is traveling on a motorway (an expressway or freeway in an urban area); 0: when it is traveling on a normal road (a road in a town, farm road, or the like)), and the vehicle distance DA and self vehicle velocity V from the trail controller 10, determines the display pattern of an image displayed on the display device 3A and/or the display device 3B, and sets a process flag L1, L2, or L3 (to be described later) ON (status 1) (note that L2 and L3 may be set ON at the same time) in accordance with the determined display pattern.

A video conversion module 52 converts an input video signal from the image sensing device 2 in accordance with the process flag L2 and/or the flag L3 passed from the display control module 51, and outputs the converted video signal to a video signal output control module 53.

Alternatively, the video signal output control module 53 makes output switching control of the video signal output from the video conversion module 52 on the display device 3A and/or the display device 3B in accordance with the process flag L1 passed from the display control module 51.

Note that both the video conversion module 52 and video signal output control module 53 need not be equipped, and either one of them need only be equipped.

A method of determining possibility of presence of an obstacle ahead of the vehicle 100 and the display pattern of a displayed image will be explained below.

The method of determining possibility of presence of an obstacle in the display control module 51 will be explained first. In general, since a motorway such as an expressway or the like is designed to ensure efficient travel of automobiles, obstacles such as a stalled vehicle, person, and the like are unlikely to be present compared to a normal road. In this embodiment, when it is determined based on the determination result of the surrounding environment determination device 7 that the vehicle 100 is traveling on the motorway, the display control module 51 determines that an object that can be an obstacle to safe travel of the vehicle 100 is unlikely to be present compared to a case wherein the vehicle 100 is traveling on a normal road. In such case, the display control module 51 determines that supportability on drive operation is relatively low even if an image sensed by the image sensing device 2 is positively displayed, and instructs the video conversion module 52 or video signal output control module 53 to restrict the display pattern, so as to reduce the load on the driver's sight due to the display of a frame in an identical display pattern irrespective of the surrounding environment.

As a restriction method of the display pattern in this embodiment, when a sensed image is displayed on either the display device 3A or 3B, if an obstacle is highly likely to be present or is actually present, the image is displayed on the display device 3A; if an obstacle is unlikely to be present, the display device 3B having lower visibility than the display device 3A is used. Or when the sensed image is displayed on both the display devices 3A and 3B, at least display on the display device 3A is turned off if an obstacle is unlikely to be present.

Figure 6:
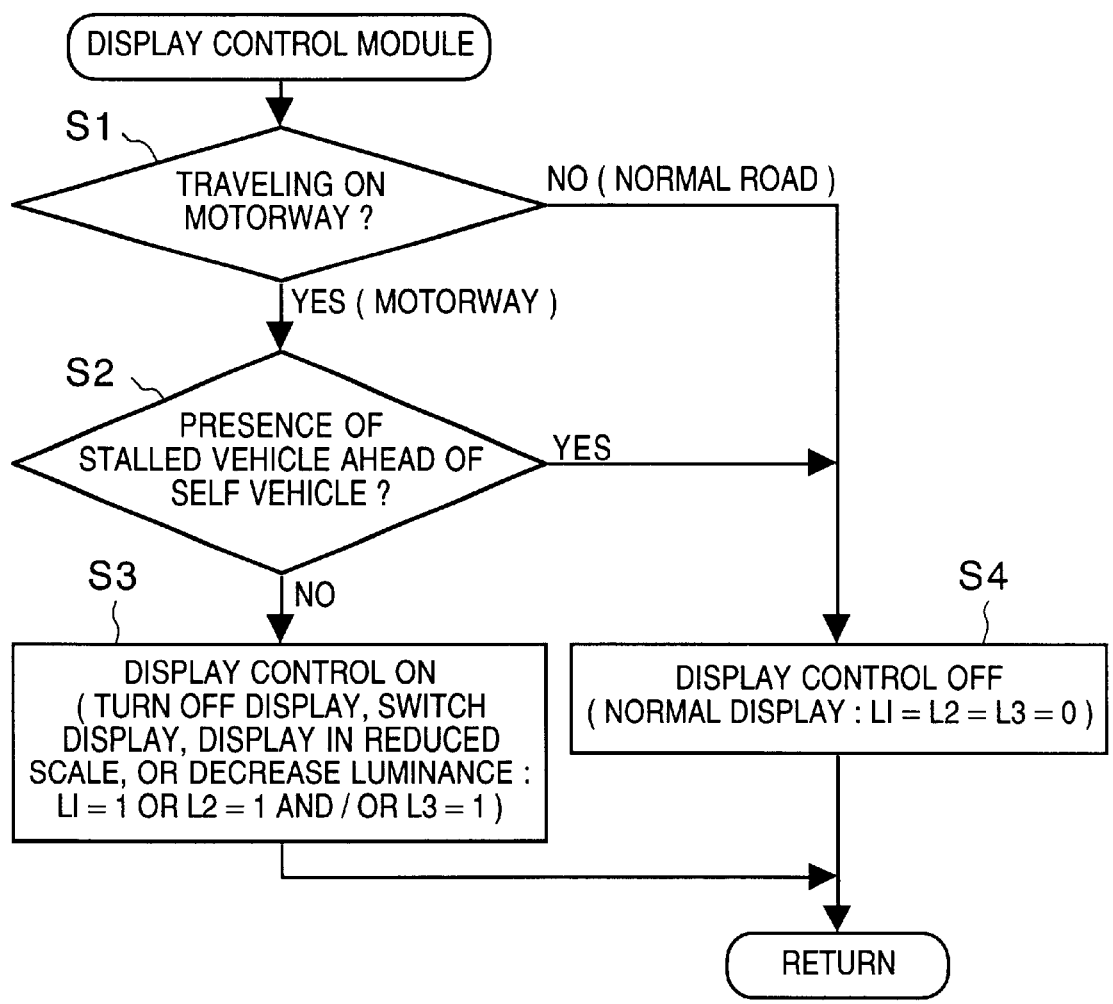
FIG. 6 is a flow chart showing software corresponding to a display control module 51 of the control processes done by the display controller in the first embodiment of the present invention.

FIG. 6 is a flow chart showing software corresponding to the display control module 51 of the control processes done by the display controller in the first embodiment of the present invention, i.e., showing processes executed by the CPU 101.

Step S1 (FIG. 6): It is checked if the surrounding environment determination signal input from the surrounding environment determination device 7 is "1". If NO in step S1 (if the vehicle 100 is traveling on a normal road), the flow advances to step S4.

Step S2: If YES in step S1 (if the vehicle 100 is traveling on a motorway), it is checked by a normal scheme based on the vehicle distance DA (the detection result of the vehicle distance sensor 4) input from the trail controller 10 and the self vehicle velocity V (a video signal of the image sensing device 2 may be used) if an obstacle such as a stalled vehicle or the like is present on the road ahead of the vehicle. If YES in step S2 (if a stalled vehicle or the like is detected), the flow advances to step S4. Note that the presence/absence of an obstacle such as a stalled vehicle or the like on the road ahead of the vehicle 100 may be determined based on information received by the road-vehicle transceiver 18.

Step S3: If NO in step S2 (if no stalled vehicle is detected), since the load on the driver's sight is to be reduced by restricting the display pattern of a displayed image, i.e., by turning off display or switching the display device, the process flags L1 to L3 are set to instruct restrictions, and are passed onto the video conversion module 52 and video signal output control module 53. Then, the flow returns.

Step S4: If the vehicle 100 is traveling on a normal road or a stalled vehicle is present ahead of the vehicle 100, since the drive operation of the driver is to be positively supported by the sensed image, the process flags L1 to L3 are set not to restrict the display pattern, i.e., are set to be L1=L2=L3=0, and are passed onto the video conversion module 52 and video signal output control module 53. Then, the flow returns.

Figure 7:
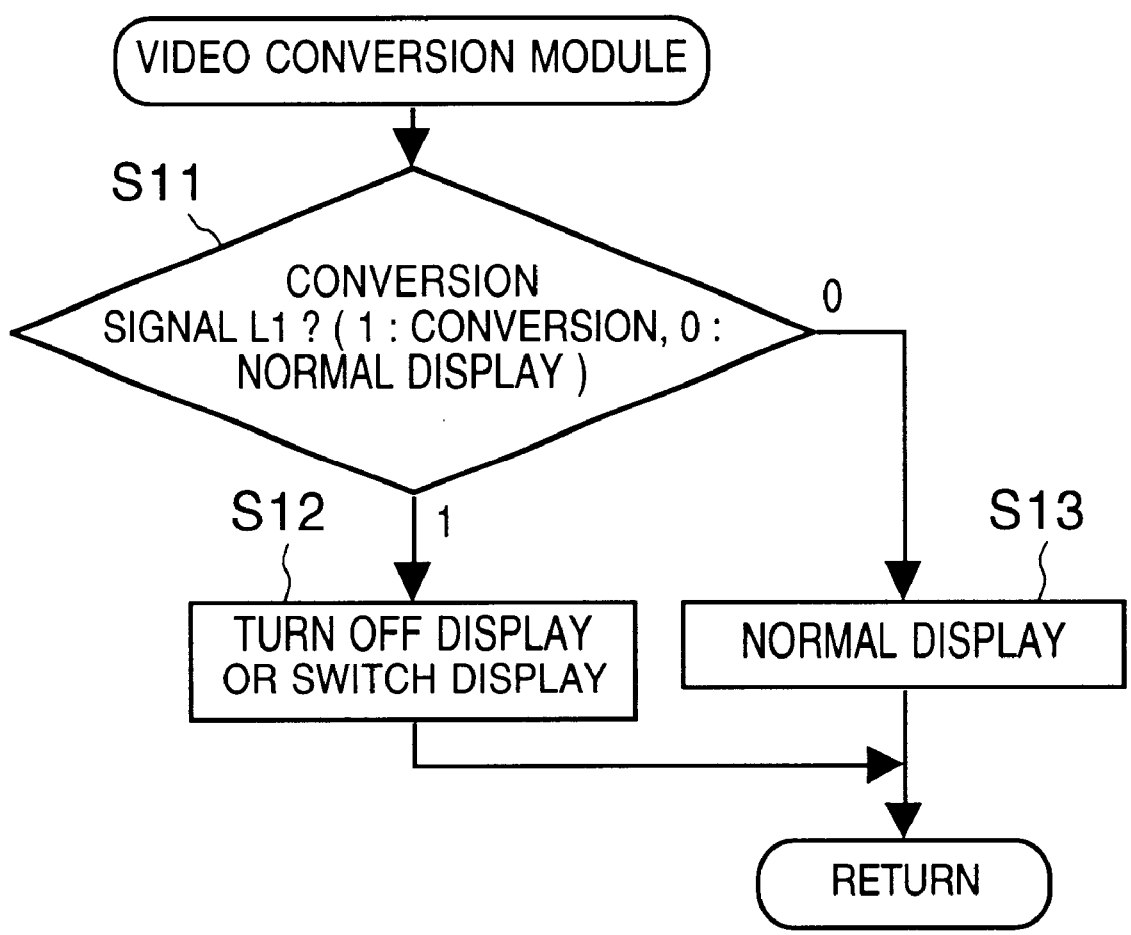
FIG. 7 is a flow chart showing software corresponding to a video signal output control module 53 upon using a process flag L1 of the control processes done by the display controller in the first embodiment of the present invention.

FIG. 7 is a flow chart showing software corresponding to the video signal output control module 53 upon using the process flag L1 of the control processes done by the display controller in the first embodiment of the present invention, i.e., showing processes executed by the CPU 101.

Step S11 (FIG. 7): The state of the conversion signal (process flag L1) passed from the display control module 51 is checked.

Step S12: If it is determined in step S11 that the conversion signal=1, since it indicates restriction of the display pattern, display on the display device 3A is turned off or display is switched to the display device 3B as in the aforementioned restriction method, and the flow returns.

Step S13: If it is determined in step S11 that the conversion signal=0, since no restriction of the display pattern is instructed, the drive operation of the driver is positively supported by using a display pattern for directly displaying a video signal from the image sensing device 2 on the display device 3A (to be referred to as normal display hereinafter), and the flow returns.

As described above, according to the display control module 51 included in the display apparatus of this embodiment, when the vehicle 100 is traveling on a motorway on which an obstacle is unlikely to be present ahead of the vehicle 100, and when a stalled vehicle is present ahead of the vehicle 100, since the display pattern of the sensed image is restricted by turning off display or by switching the display device used, the situation around the vehicle can be satisfactorily displayed, and the display pattern can be appropriately switched in accordance with the surrounding environment. For this reason, the load on the driver's sight can be reduced.

Control executed when the display luminance of at least the display device 3A is decreased if possibility of presence of an obstacle is low will be explained below.

Figure 8:
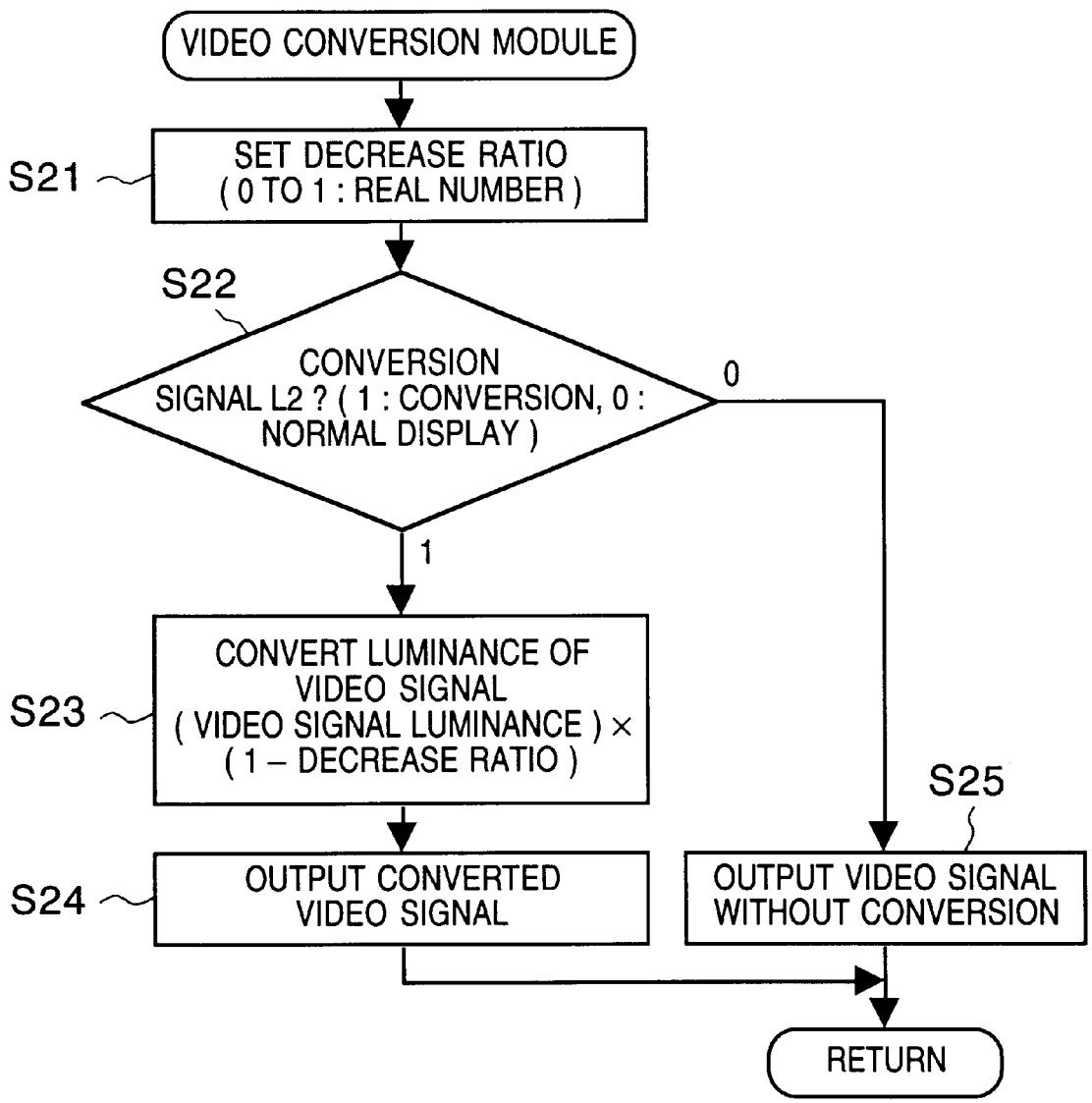
FIG. 8 is a flow chart showing software implemented by a video conversion module 52 using a process flag L2 of the control processes done by the display controller in the first embodiment of the present invention.

FIG. 8 is a flow chart showing software implemented by the video conversion module 52 upon using the process flag L2 of the control processes done by the display controller in the first embodiment of the present invention, i.e., showing processes executed by the CPU 101.

Step S21 (FIG. 8): A predetermined luminance decrease ratio is set in the RAM 102.

Step S22: The state of the conversion signal (process flag L2) passed from the display control module 51 is checked.

Step S23: If it is determined in step S21 that the conversion signal=1, since it indicates restriction of the display pattern, the luminance of an input video signal is converted by:

(Converted video signal luminance)=(input signal luminance)×(1−decrease ratio)

to decrease the display luminance of at least the display device 3A as in the above-mentioned restriction method. Note that the decrease ratio is a pre-set value smaller than unity.

Step S24: The video signal converted in step S23 is output at least to the display device 3A (when the display luminance of only the display device 3A is decreased, normal display is made on the display device 3B), and the flow returns.

Step S25: If it is determined in step S22 that the conversion signal (process flag L2)=0, since no restriction of the display pattern is instructed, normal display is made on the display devices 3A and 3B as in the first embodiment described above, and the flow returns.

As described above, according to the video conversion module 52 in the display apparatus of this embodiment, when the vehicle 100 is traveling on a motorway on which an obstacle is unlikely to be present ahead of the vehicle 100, and when a stalled vehicle is present ahead of the vehicle 100, since the display pattern of the sensed image is restricted by decreasing the display luminance, the situation around the vehicle can be satisfactorily displayed, and the display pattern can be appropriately switched in accordance with the surrounding environment. For this reason, the load on the driver's sight can be reduced.

Control executed when the sensed image is displayed with a reduced display area on at least the display device 3A if possibility of presence of an obstacle is low will be explained below.

When the display area of the display device 3A is smaller than that of the display device 3A, display switching from the display device 3A to the display device 3B corresponds to reduced-scale display of the sensed image.

Figure 10:
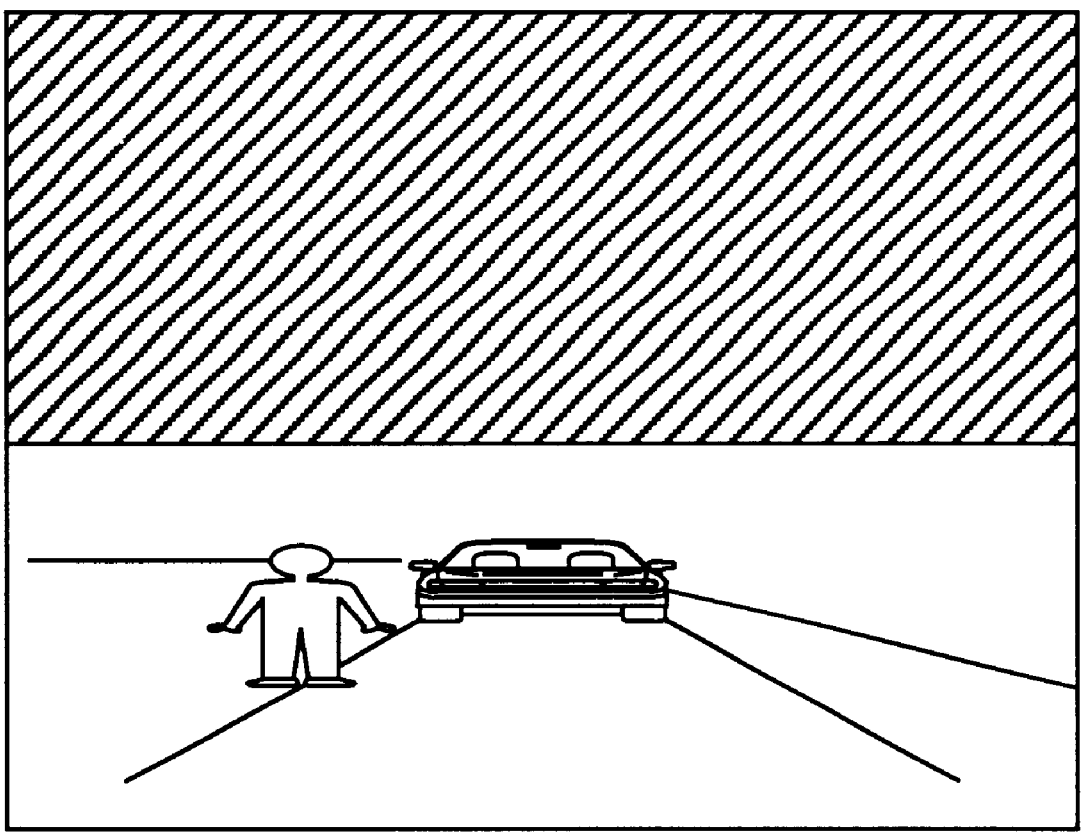
FIG. 10 shows an example of a frame when the display pattern of the display apparatus in the first embodiment of the present invention is restricted (when the frame is reduced in the vertical direction)
Figure 11:
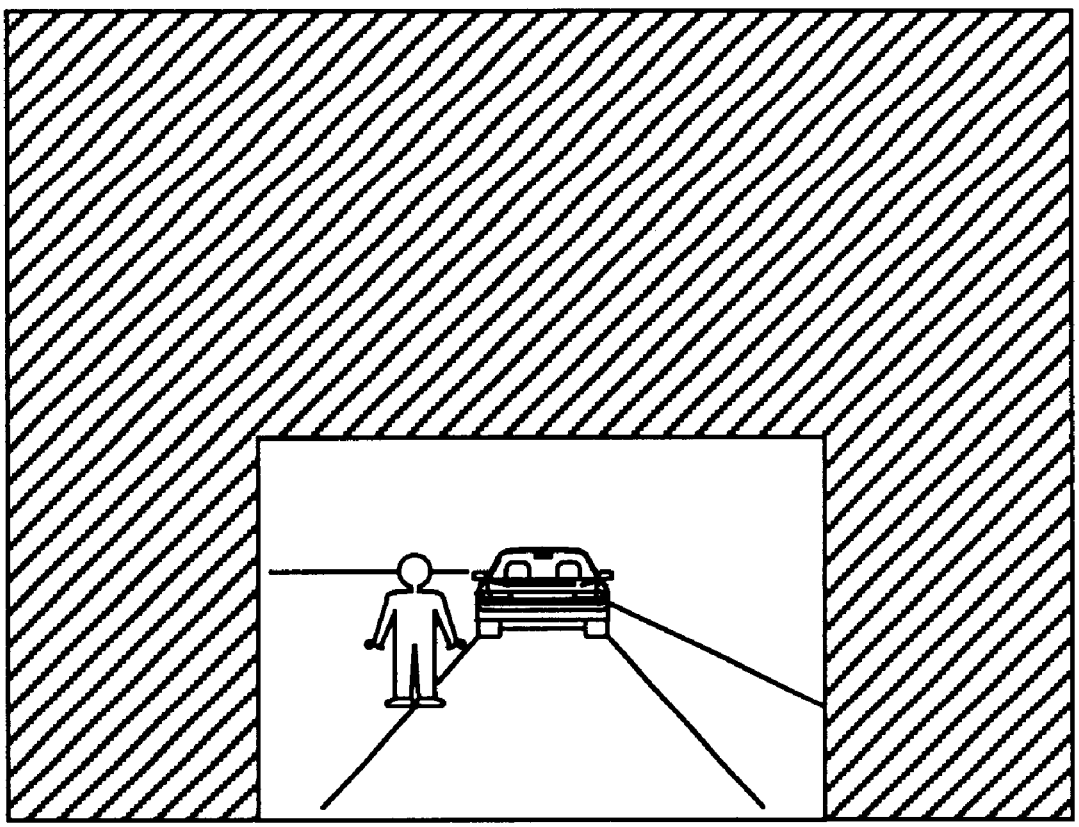
FIG. 11 shows an example of a frame when the display pattern of the display apparatus in the first embodiment of the present invention is restricted (when the frame is evenly reduced in the vertical and horizontal directions)

FIGS. 10 and 11 show examples of the frame displayed when the display pattern of the display apparatus in the first embodiment of the present invention is restricted. FIG. 10 shows the sensed image reduced in the vertical direction, and FIG. 11 shows the sensed image evenly reduced in the vertical and horizontal directions. In either display example, a hatched portion can be displayed in display color such as black or the like.

Figure 9:
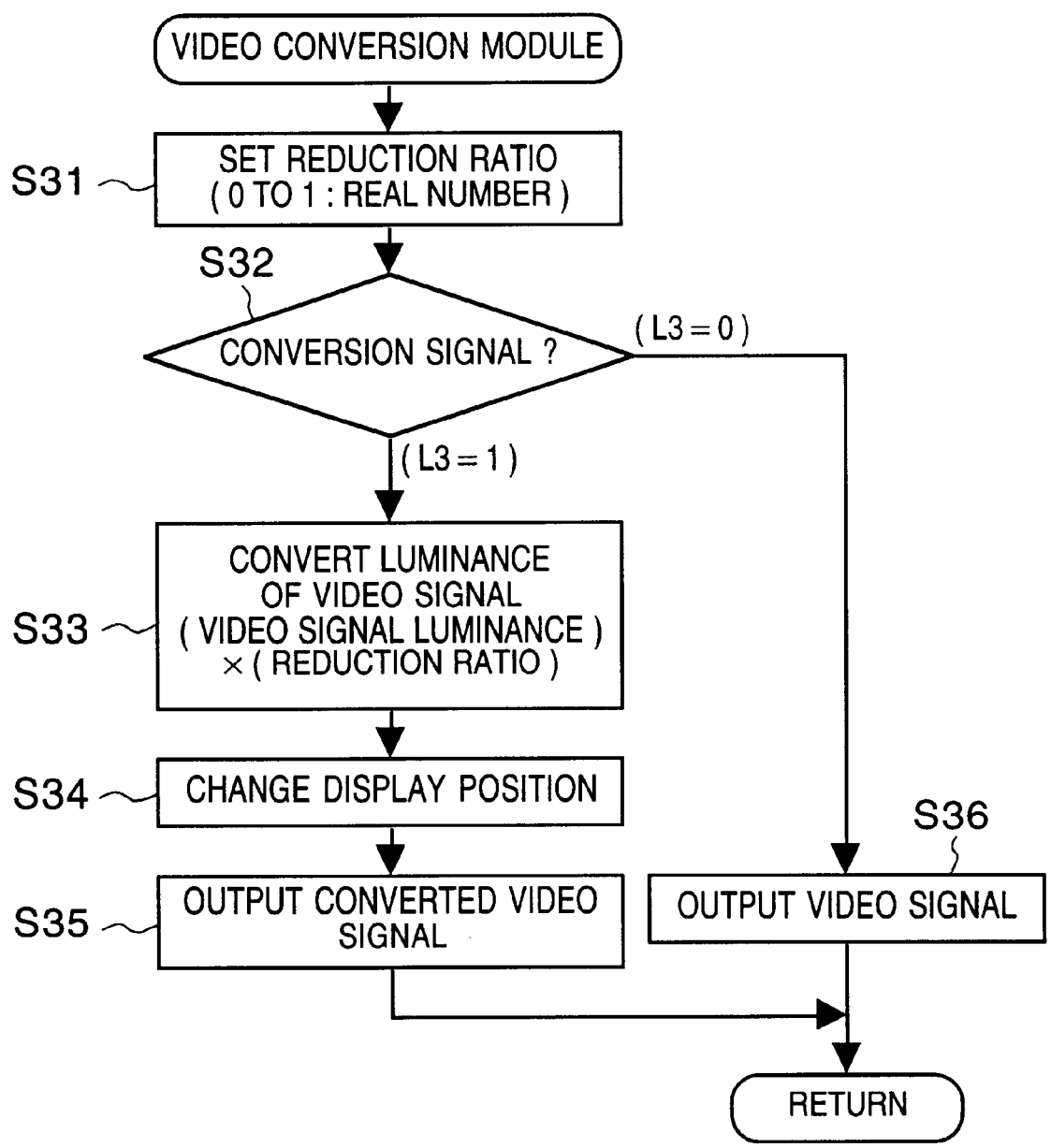
FIG. 9 is a flow chart showing software corresponding to the video conversion module 52 or video signal output control module 53 of the control processes done by the display controller in the first embodiment of the present invention.

FIG. 9 is a flow chart showing software corresponding to the video conversion module 52 or video signal output control module 53 of the control processes done by the display controller in the first embodiment of the present invention, i.e., showing processes executed by the CPU 101.

Step S31 (FIG. 9): Predetermined vertical and horizontal reduction ratios are set in the RAM 102.

Step S32: The state of the conversion signal (process flag L3) passed from the display control module 51 is checked.

Step S33: If it is determined in step S32 that the conversion signal L3=1, since it indicates restriction of the display mode, an input video signal is converted by:

(Converted video signal)=(input video signal luminance)×(reduction ratio)

so as to reduce the display area of the sensed image on at least the display device 3A as in the reduced-scaled frame shown in, e.g., FIG. 10 or 11, as described in the restriction method. Note that the reduction ratio is a pre-set value.

Steps S34 and S35: The display position of the video signal converted in step S33 is changed by a normal method (step S34), and the changed video signal is output to at least the display device 3A (when the display area of only the display device 3A is reduced, normal display is made on the display device 3B). The flow then returns.

Step S36: If it is determined in step S32 that the conversion signal L3=0, since no restriction of the display pattern is instructed, normal display is made on the display devices 3A and 3B as in the first embodiment described above, and the flow returns.

As described above, according to the video conversion module 52 or video signal output control module 53 in the display apparatus of this embodiment, when the vehicle 100 is traveling on a motorway on which an obstacle is unlikely to be present ahead of the vehicle 100, and when a stalled vehicle is present ahead of the vehicle 100, since the display pattern of the sensed image is restricted by reducing the display area, the situation around the vehicle can be satisfactorily displayed, and the display pattern can be appropriately switched in accordance with the surrounding environment. For this reason, the load on the driver's sight can be reduced.

[Second Embodiment]

In this embodiment, based on the apparatus arrangement of the display apparatus according to the first embodiment described above, when the vehicle is trailing along behind the lead vehicle, it is determined that an obstacle is unlikely to be present in the current surrounding environment, and in such case, the display pattern of the sensed image on the display devices 3A and 3B is restricted. In this embodiment, since the restriction method of the display pattern is the same as that in the first embodiment, characteristic features that pertain to trail will be mainly explained below.

Figure 12:
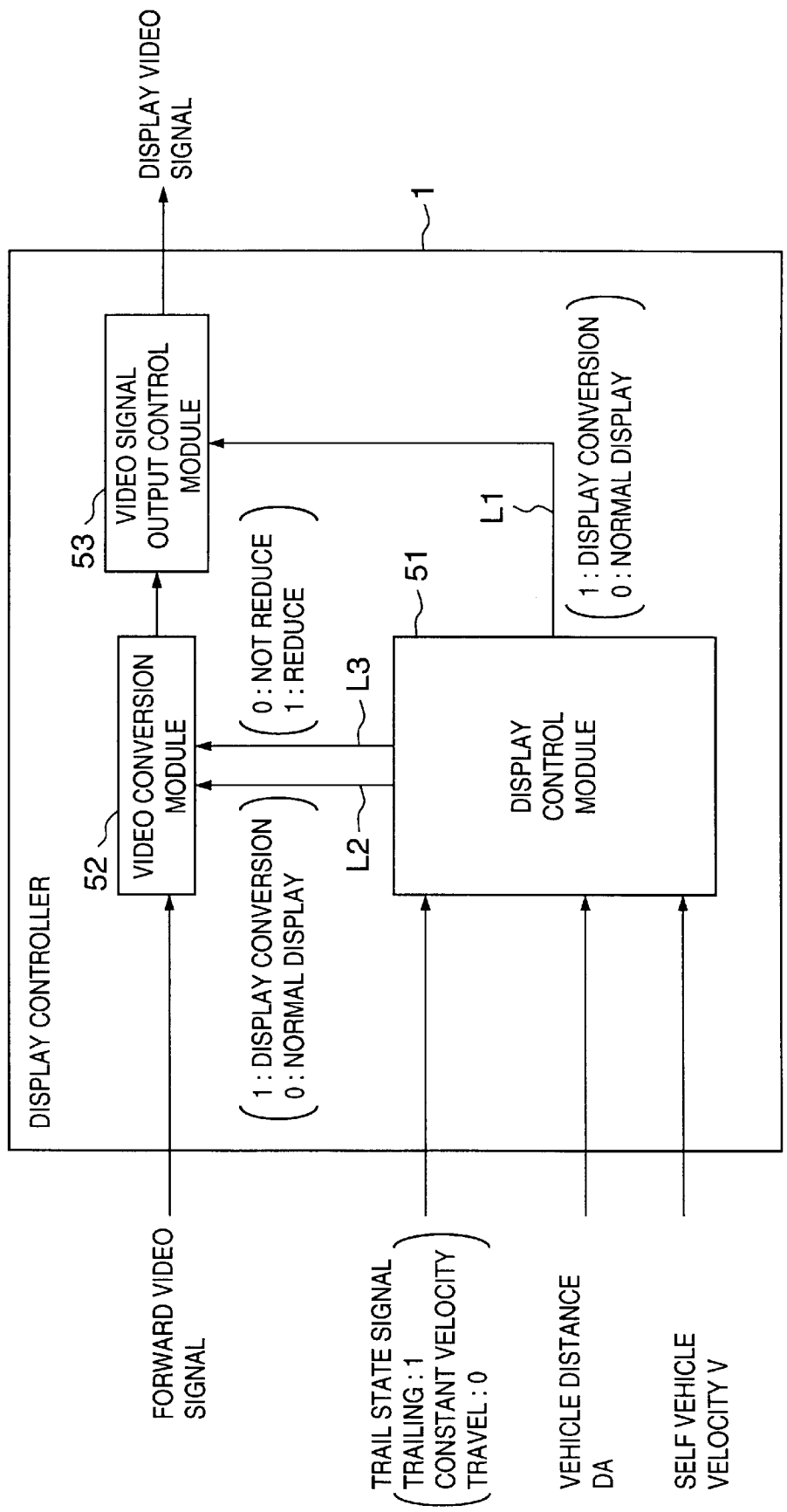
FIG. 12 is a diagram showing as functional modules control processes done by a display controller in the second embodiment of the present invention.

FIG. 12 shows as functional modules control processes done by the display controller in the second embodiment of the present invention. Unlike FIG. 5, a trail state signal (1: indicates that trail is in progress; 0: indicates constant velocity travel) is input from the trail controller 10 in place of the surrounding environment determination signal.

The trail control of the trail controller 10 will be described below with reference to FIG. 13.

Figure 13:
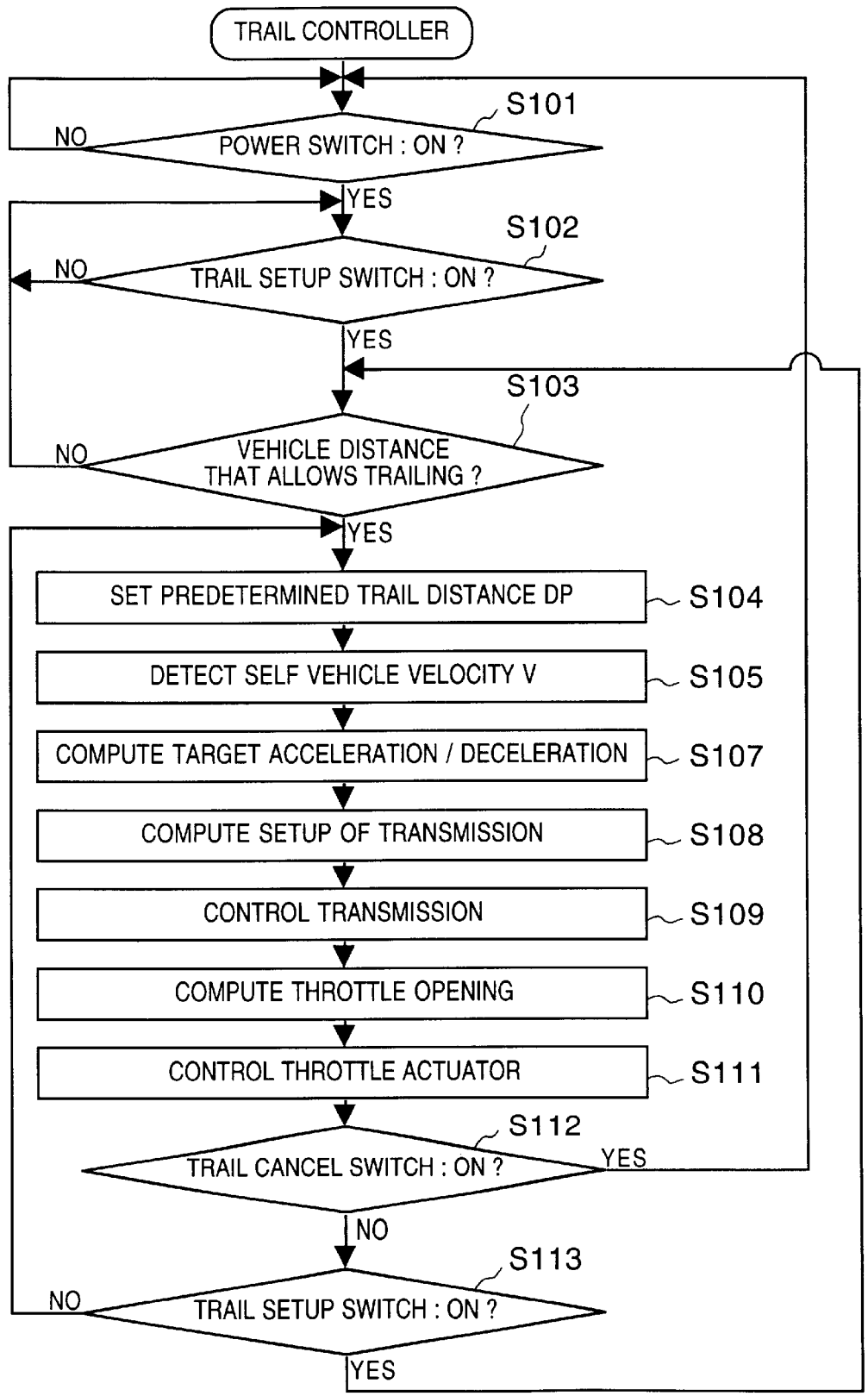
FIG. 13 is a flow chart showing a trail control process by a trail controller in the second embodiment of the present invention.

FIG. 13 is a flow chart showing the trail control process by the trail controller in the second embodiment of the present invention, i.e., processes started by a CPU (not shown) of the trail controller 10 upon turning on the power switch 12.

Step S101 (FIG. 13): It is checked if the power switch 12 is turned on. If NO in step S101, the control waits for input in this step.

Step S102: If YES in step S101 (switch 12=ON), it is checked if the trail setup switch 11 is turned on. If NO in step S102, the control waits for input in this step.

Step S103: If YES in step S102 (switch 11=ON), the vehicle distance DA is detected, and it is checked if the detected value falls within a predetermined distance range (e.g., 100 m or less) in which trail is possible. If NO in step S103 (trail control is impossible), the flow returns to step S102.

Steps S104 and S105: A predetermined trail distance DP is set in a RAM (not shown) (step 104), and the self vehicle velocity V is detected (step S105).

Step S107: A target acceleration/deceleration is computed based on the trail distance DP, detected vehicle distance DA, and self vehicle velocity V by a normal method to make the self vehicle travel to follow up the lead vehicle while maintaining the trail distance DP.

Steps S108 to S111: A control variable to be set in the transmission controller 16 is computed in accordance with the target acceleration/deceleration computed in step S107 (step S108), and the automatic transmission 17 is controlled by the computed control variable (step S109). Also, a control variable (throttle opening) to be set in the throttle controller 14 is computed (step S110), and the throttle actuator 15 is controlled by the computed control variable (step S111).

Step S112: It is checked if the trail cancel switch 13 is turned on. If YES in step S112 (switch 13=ON), the flow returns to step S101.

Step S113: If NO in step S112 (switch 13=OFF), it is checked if the driver has turned on the trail setup switch 11 again to re-set a desired trail state during the control process in the current control period. If NO in step S113 (switch 11 is not operated), the flow returns to step S104 to proceed with control in the current setup state. On the other hand, if YES in step S113 (switch 11 is operated), the flow returns to step S101.

Note that the trail controller 10 sets the aforementioned trail state signal to be 1 (the vehicle is trailing the lead vehicle) while repeating the aforementioned control starting from step S104 returning to step S104 since NO is determined in step S113, while the power switch 12 is ON. The controller 10 sets the trail state signal to be 0 (free travel) when the trail cancel switch 13 is turned on and when the vehicle distance DA falls outside the range in which trail is possible even when the trail setup switch 11 is turned on.

Figure 14:
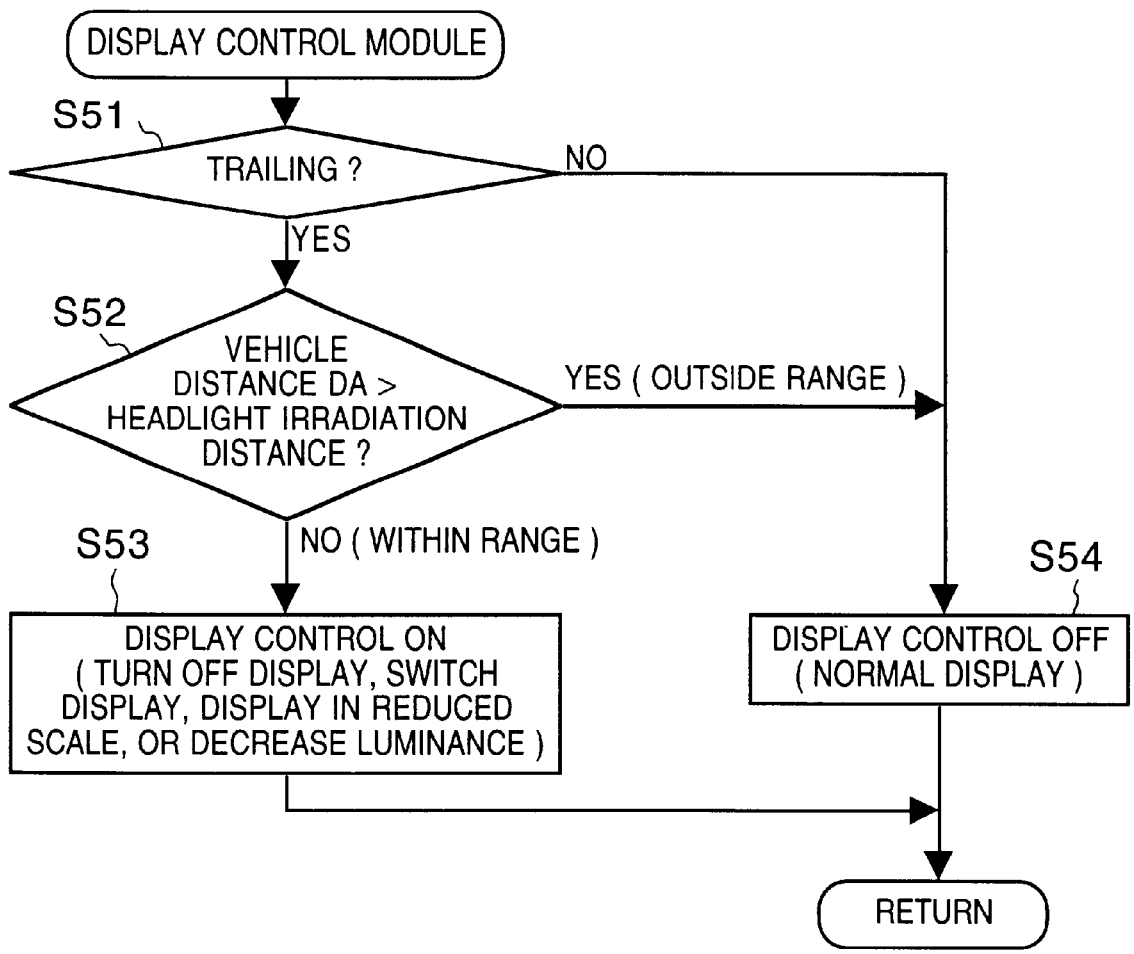
FIG. 14 is a flow chart showing software corresponding to a display control module 51 of the control processes done by the display controller in the second embodiment of the present invention.

FIG. 14 is a flow chart showing software corresponding to the display control module 51 of the control processes done by the display controller in the second embodiment of the present invention, i.e., processes executed by the CPU 101.

Step S51 (FIG. 14): It is checked based on the trail state signal input from the trail controller 10 if the vehicle 100 is trailing along behind the lead vehicle, by determining, e.g., if the trail setup switch 11 is ON. If NO in step S51 (non-trail is in progress), the flow advances to step S54.

Step S52: If YES in step S51 (the vehicle is trailing the lead vehicle), it is checked if the vehicle distance DA (the detection result of the vehicle distance sensor 4) input from the trail controller 10 is larger than a predetermined irradiation distance of headlights pre-stored in the ROM 103. If YES in step S52 (outside the irradiation range), the flow advances to step S54.

Step S53: If NO in step S52 (within the irradiation range), since possibility of presence of an obstacle ahead of the vehicle is low, and the load on the driver's sight is to be reduced by restricting the display pattern of the displayed image, e.g., by turning on display or switching the display device used using the process flags L1 to L3 in the first embodiment, at least one of the process flags L1 to L3 is set to instruct restriction, and is passed onto the video conversion module 52 and/or the video signal output control module 53. The flow then returns.

Step S54: If the vehicle 100 is not trailing the lead vehicle, or if no lead vehicle is present within the irradiation range (e.g., the range from 40 m to 50 m) of the headlights, since the drive operation of the driver is to be positively supported using the sensed image, the process flags L1 to L3 are set not to restrict the display pattern, and passed onto the video conversion module 52 and video signal output control module 53. The flow then returns.

As described above, according to the display apparatus of this embodiment, during trail in which an obstacle is unlikely to be present ahead of the vehicle 100, since the display pattern of the sensed image is restricted, the situation around the vehicle can be satisfactorily displayed, and the display pattern can be appropriately switched in accordance with the surrounding environment. For this reason, the load on the driver's sight can be reduced.

<First Modification of Second Embodiment>

In step S52, the irradiation distance of the headlights is used to compare the vehicle distance DA with a predetermined value. In this modification, the predetermined value is determined in accordance with the self vehicle velocity V. More specifically, in this modification, a vehicle distance Dref (m) serving as a predetermined value to be compared with the detected vehicle distance DA is computed by:

Vehicle distance Dref $(m)$=self vehicle velocity $V$ $(km/h)\times 3,600/1,000\times$vehicle time headway 2 (sec), Note that the vehicle time headway is the travel time required for the self vehicle to travel from its current position to the position of the lead vehicle at that time, while the self vehicle is trailing along behind the lead vehicle. In general, in a state in which the vehicle time headway is around 2 sec, possibility of presence of a new obstacle between the self vehicle and lead vehicle is low.

Figure 15:
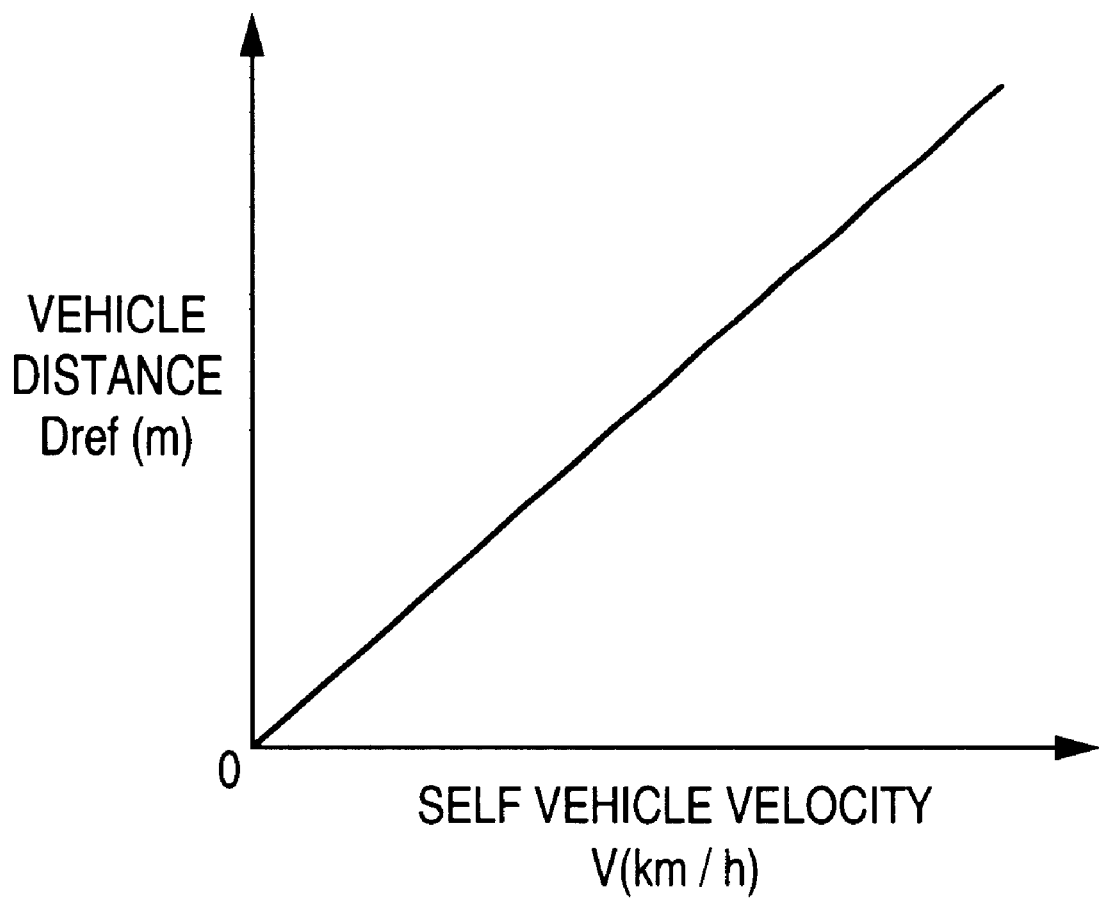
FIG. 15 is a graph for explaining the relationship between the self vehicle velocity V and vehicle distance Dref in the first modification of the second embodiment of the present invention.

Hence, in this modification, the vehicle distance Dref according to the self vehicle velocity V is computed by the above formula. When the current vehicle distance is shorter than the computed vehicle distance, it is determined that possibility of presence of an obstacle between itself and the lead vehicle is low, and the display pattern of the displayed image is restricted. For this purpose, the above formula or a look-up table having characteristics shown in FIG. 15 corresponding to the above formula is pre-stored, and the vehicle distance Dref is computed as the predetermined value in accordance with the self vehicle velocity V at that time in step S52. According to this modification, the same effect as in the above embodiment can be obtained.

<Second Modification of Second Embodiment>

In this modification, based on the apparatus arrangement of the display apparatus according to the second embodiment mentioned above, a case will be explained below wherein the state in which the vehicle is trailing the lead vehicle is determined using information acquired from the road-vehicle transceiver 18.

Figure 16:
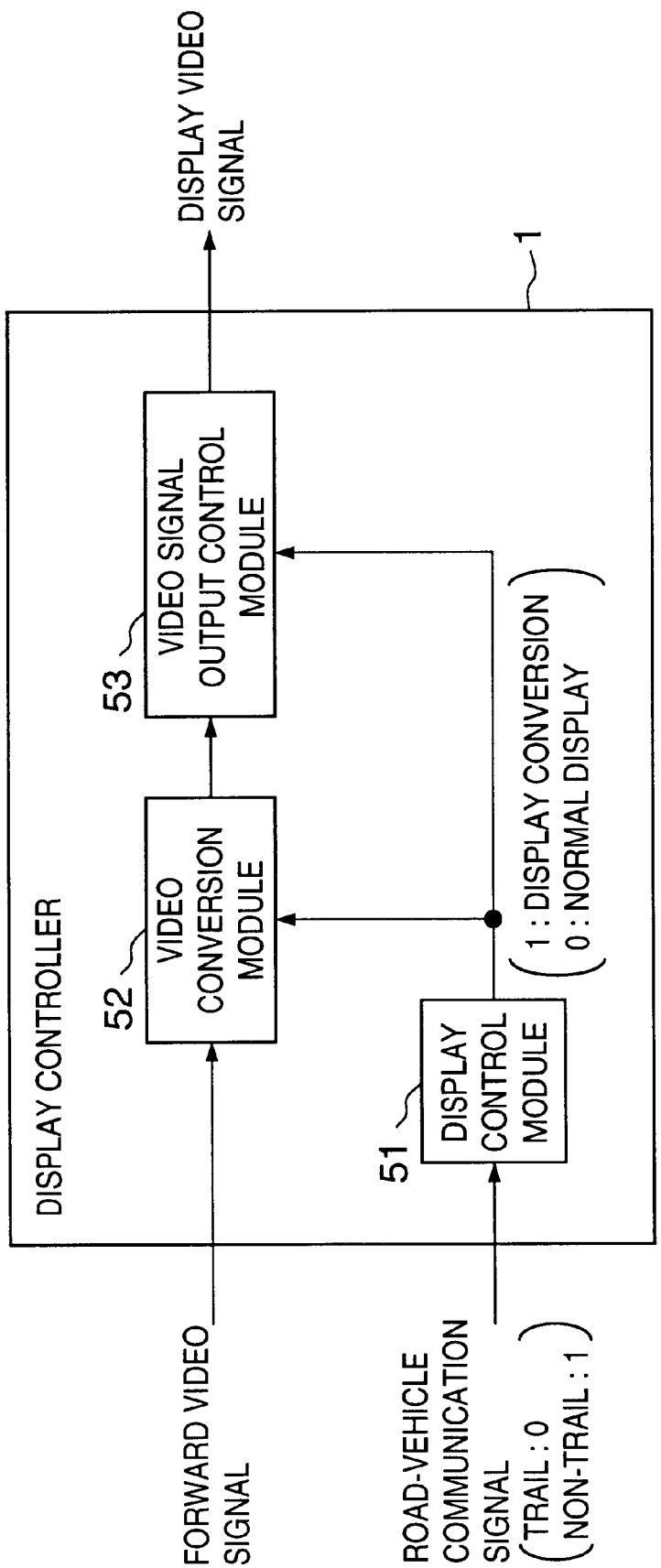
FIG. 16 is a diagram showing as functional modules control processes done by the display controller in the second modification of the second embodiment of the present invention.

FIG. 16 shows as functional modules the control processes done by the display controller in the second modification of the second embodiment of the present invention. Unlike FIG. 12, the display control module 51 makes determination based on the state of a signal (1: indicates trail; 0: non-trail) which is input from the road-vehicle transceiver 18 and indicates if the vehicle is traveling in a file (i.e., if the vehicle is trailing the path of the lead vehicle). More specifically, when a road-vehicle communication signal is "1", the display control module 51 determines that an obstacle is unlikely to be present ahead of the self vehicle, and instructs the video conversion module 52 and video signal output control module 53 to restrict the display pattern as in the above embodiments; when the signal is "0", the module 51 instructs those modules to make normal display so as to positively support the drive operation of the driver using the sensed image.

According to such modification, since the display pattern of the sensed image is restricted during trail in which an obstacle is unlikely to be present ahead of the vehicle 100, the situation around the vehicle can be satisfactorily displayed, and the display pattern can be appropriately switched in accordance with the surrounding environment. For this reason, the load on the driver's sight can be reduced.

In each of the above embodiments, the control processes by the display controller 1 are implemented by software which is executed by the CPU 101. Alternatively, control operations of the display control module 51, video conversion module 52, and video signal output control module 53 shown in FIGS. 5 and 12 may be implemented by dedicated hardware.

[Third Embodiment]

The third embodiment of the present invention will be described below with reference to FIGS. 17 and 18.

Figure 17:
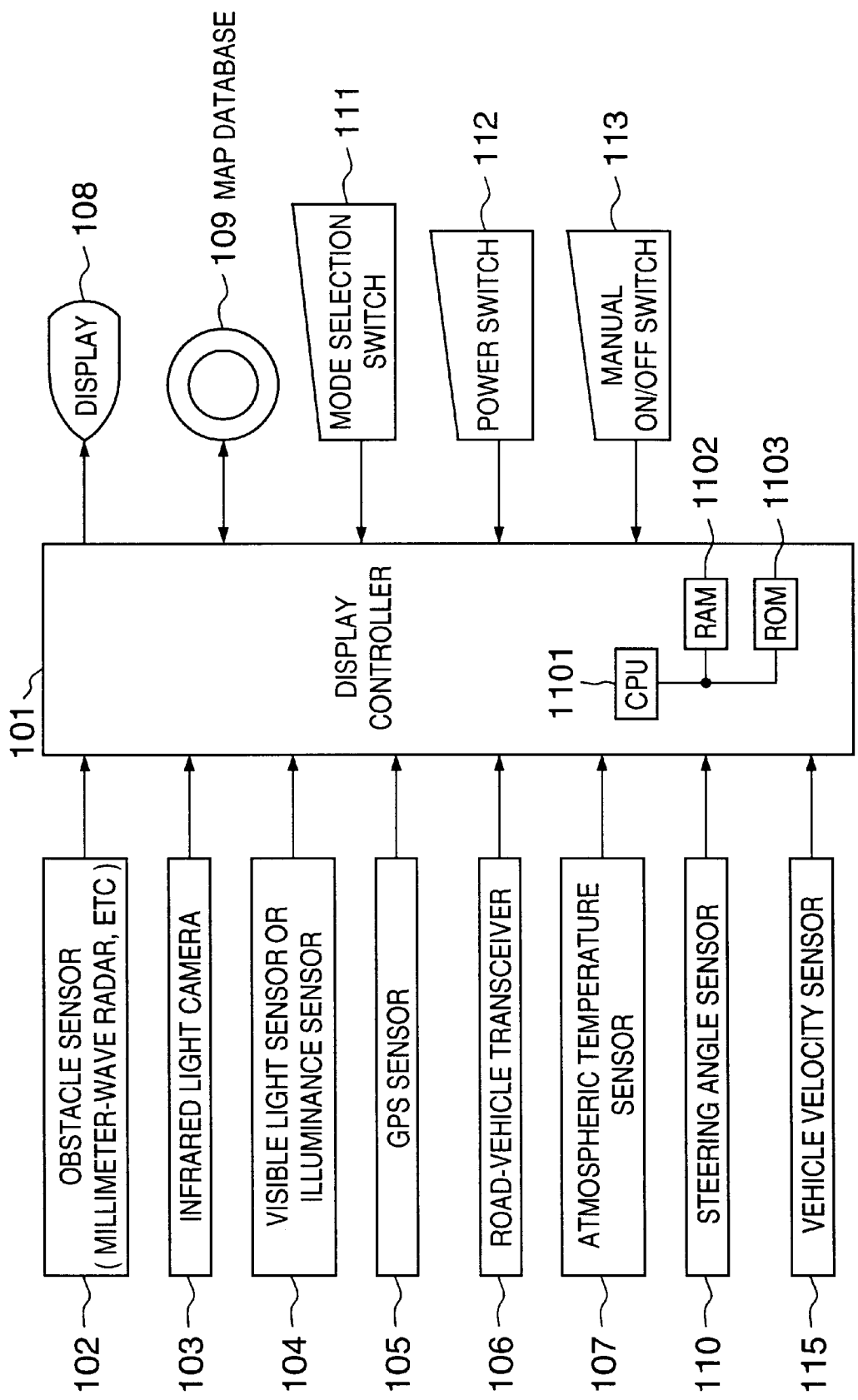
FIG. 17 is a block diagram of a display device on a vehicle according to the third embodiment of the present invention.

FIG. 17 is a block diagram of a display apparatus on a vehicle according to the third embodiment of the present invention.

Referring to FIG. 17, reference numeral 102 denotes an obstacle sensor such as a CCD (Charge Coupled Device) camera, laser radar, millimeter-wave radar, or the like for detecting distance to an object ahead of the self vehicle by a known method. Reference numeral 103 denotes an infrared light (infrared ray) camera for sensing an image of an environment ahead of the self vehicle using infrared rays.

Reference numeral 104 denotes a visible light camera for sensing a visible light image ahead of the self vehicle or an illuminance sensor which is disposed having its detection surface facing in front of the self vehicle. Reference numeral 105 denotes a GPS (global positioning system) sensor for externally receiving a GPS sensor used upon computing the current position of the self vehicle.

Reference numeral 106 denotes a road-vehicle transceiver which is the same as the road-vehicle transceiver 18 mentioned above. Reference numeral 107 denotes an atmospheric temperature sensor for detecting the temperature outside the passenger room of the self vehicle. Reference numeral 108 denotes a display such as a liquid crystal display, head-up display, or the like for displaying an image (to be referred to as a sensed image hereinafter) sensed by the infrared light camera 103. Note that the display 108 is preferably laid out at a position (e.g., near the central position of a dashboard, or the like) in front of the driver seat of the self vehicle where the driver can easily see the sensed image without largely moving the line of sight when he or she looks forward.

Reference numeral 109 denotes a map database. Reference numeral 110 denotes a steering angle sensor for detecting the steering angle of the self vehicle. Reference numeral 115 denotes a vehicle velocity sensor for detecting the vehicle velocity of the self vehicle.

Reference numeral 111 denotes a mode selection switch which allows the operator to select one of display modes of the sensed image on the display 108. The display modes selectable by this switch include a manual mode in which the sensed image of the infrared light camera 103 is displayed on the display 108 without any modifications while the operator holds a manual ON/OFF switch 113 ON, and an auto mode in which in which, e.g., a reduced-scale image is displayed on the display 108 in accordance with a display control process (to be described later) when the auto mode is selected by the mode selection switch 111. Reference numeral 112 denotes a power switch which allows the operator to turn on/off power supply to a display controller 101.

The manual ON/OFF switch 113 is used to display the sensed image of the infrared light camera 103 on the display 108 without any modifications while the operator selects the manual mode using the mode selection switch 111 and holds the switch 113 ON.

The display controller 101 controls display of the sensed image of the infrared light camera 103 on the display 108 on the basis of the output signals (data corresponding to the output signals) from the aforementioned sensors, and the detected operation states of the operation switches (this control process will be explained in detail later). The display control process by the display controller 101 is executed by a CPU 1101 in accordance with software pre-stored in, e.g., a ROM 1103 or the like while using a RAM 1102 as a work area.

The display control process done by the display controller 101 in this embodiment will be described in detail below.

Figure 18:
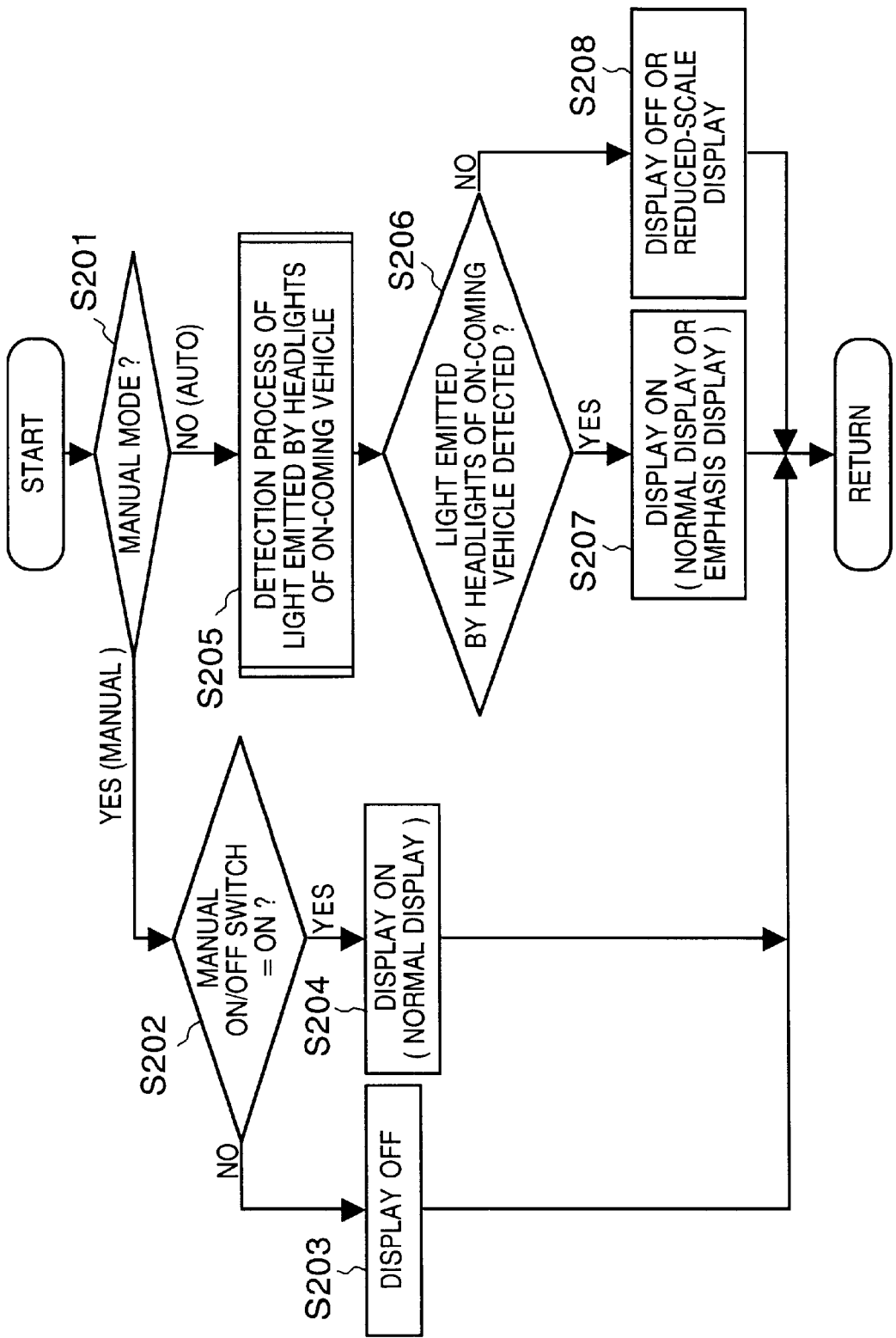
FIG. 18 is a flow chart showing a display control process by the display apparatus on a vehicle according to the third embodiment.

FIG. 18 is a flow chart showing the display control process done by the display apparatus on a vehicle according to the third embodiment, i.e., showing the sequence of software executed by the CPU 1101 while an ignition switch of the self vehicle is ON and the power switch 111 is ON.

Step S201 (FIG. 18): It is checked by detecting the operation state of the mode selection switch 111 if the manual mode is selected. If YES in step S201 (manual mode), the flow advances to step S202; if NO in step S201 (auto mode), the flow advances to step S205.

Steps S202 to S204: It is checked if the manual ON/OFF switch 113 is ON in the current state selected with the manual mode. If NO in step S202 (switch 113: OFF), the display controller stops display of the sensed image on the display 108 (step S203); if YES in step S202 (switch 113: ON), the display controller starts or proceeds with display of the sensed image of the infrared light camera 103 (i.e., an infrared light image which does not undergo any modifications in the auto mode to be described later: see the display example in FIG. 4) on the display 108 (step S204).

Step S205: In the current state selected with the auto mode, it is detected based on data corresponding to the output signal from the visible light camera (illuminance sensor) 104 if the self vehicle is irradiated with light emitted by headlights or head lamps of an on-coming vehicle. An example of a method of detecting light emitted by headlights of the on-coming vehicle will be explained below.

(1) When image sensed by visible light camera is used: An image is sensed by the visible light camera which is disposed to be able to sense an image ahead of the self vehicle. At this time, the stop of the visible light camera must be set to detect only light brighter than light emitted by the headlights with normal brightness so as to detect incoming light of the headlights of the on-coming vehicle in place of being automatically adjusted in correspondence with the environment around the vehicle. An image signal sensed by the visible light camera is binarized by a known method using an appropriate threshold value, and the area (the number of pixels) of a bright image included in the binarized image (binary image) is counted. If the count result is larger than a predetermined value (which is set in consideration of the distance between the on-coming vehicle and the self vehicle) set in advance, it can be determined that the self vehicle is irradiated with light emitted by headlights of a relatively close on-coming vehicle and, hence, that light of headlights is detected with a large area.

(2) When detection signal of illuminance sensor is used: The illuminance is detected by the illuminance sensor disposed having its detection surface facing in front of the self vehicle, and if the detection result is larger than predetermined brightness (which is set in consideration of the distance between the on-coming vehicle and the self vehicle), it can be determined that the self vehicle is irradiated with light emitted by headlights of a relatively close on-coming vehicle and, hence, that light emitted by headlights is detected with higher brightness.

In the aforementioned method of using the visible light camera or illuminance sensor, in order to improve detection precision as to whether or not the detected incoming light is the light emitted by the headlights of the on-coming vehicle, the time (night time) at which the on-coming vehicle turns on head lamps is preferably limited by adding time information which can be acquired from, e.g., the GPS sensor 105 or the like to determination factors. Even in daytime, if the current position of the self vehicle detected using the GPS sensor 105 and map database 109 is in a tunnel, the time information can be added to determination factors as the time at which the on-coming vehicle is most likely to turn on head lamps.

Step S206: It is checked if light emitted by headlights of the on-coming vehicle is detected in the detection process in step S205. If YES in step S205 (light emitted by headlights is detected), the flow advances to step S207; if NO in step S205 (no light emitted by headlights is detected), the flow advances to step S208.

Step S207: It can be determined that the light emitted by headlights of the on-coming vehicle has been detected in step S206, and the driver of the self vehicle can hardly recognize the situation ahead of the self vehicle due to that light emitted by headlights. Hence, in this step an image sensed by the infrared light camera 103 is displayed on the display 108 in a display pattern as it is without any modifications (see the display example in FIG. 4), or is emphasized and displayed by a known image process such as outline emphasis, an increase in display luminance, or the like. The flow then returns.

Step S208: Since no light emitted by headlights of the on-coming vehicle is detected in step S206, it can be determined that the driver can sufficiently visibly confirm the situation ahead of the self vehicle. In this case, the display controller stops display of the sensed image on the display 108 so as to reduce the load on the driver's sight. Or the sensed image is displayed in a reduced scale, as shown in FIG. 11 that shows a reduced-scale display example corresponding to a normal display example shown in FIG. 4. Then, the flow returns. When emphasis display is made in step S207, normal display may be made in this step, as shown in FIG. 4.

As described above, according to this embodiment, when the self vehicle does not detect any light from headlights of an on-coming vehicle, since display of an image sensed by the infrared light camera 103 is restricted (display of the sensed image is stopped or the sensed image is displayed in a reduced scale), the load on the driver's sight can be reduced. On the other hand, if headlight light is detected, since restriction of the display pattern is canceled, normal or emphasis display is made. Hence, the driver's sight can be adequately supported in correspondence with the surrounding environment.

[Fourth Embodiment]

The fourth embodiment based on the display apparatus on a vehicle according to the third embodiment mentioned above will be explained below. In the following description, a repetitive explanation of the same arrangement as in the third embodiment will be omitted, and only characteristic features of this embodiment will be mainly explained.

Figure 19:
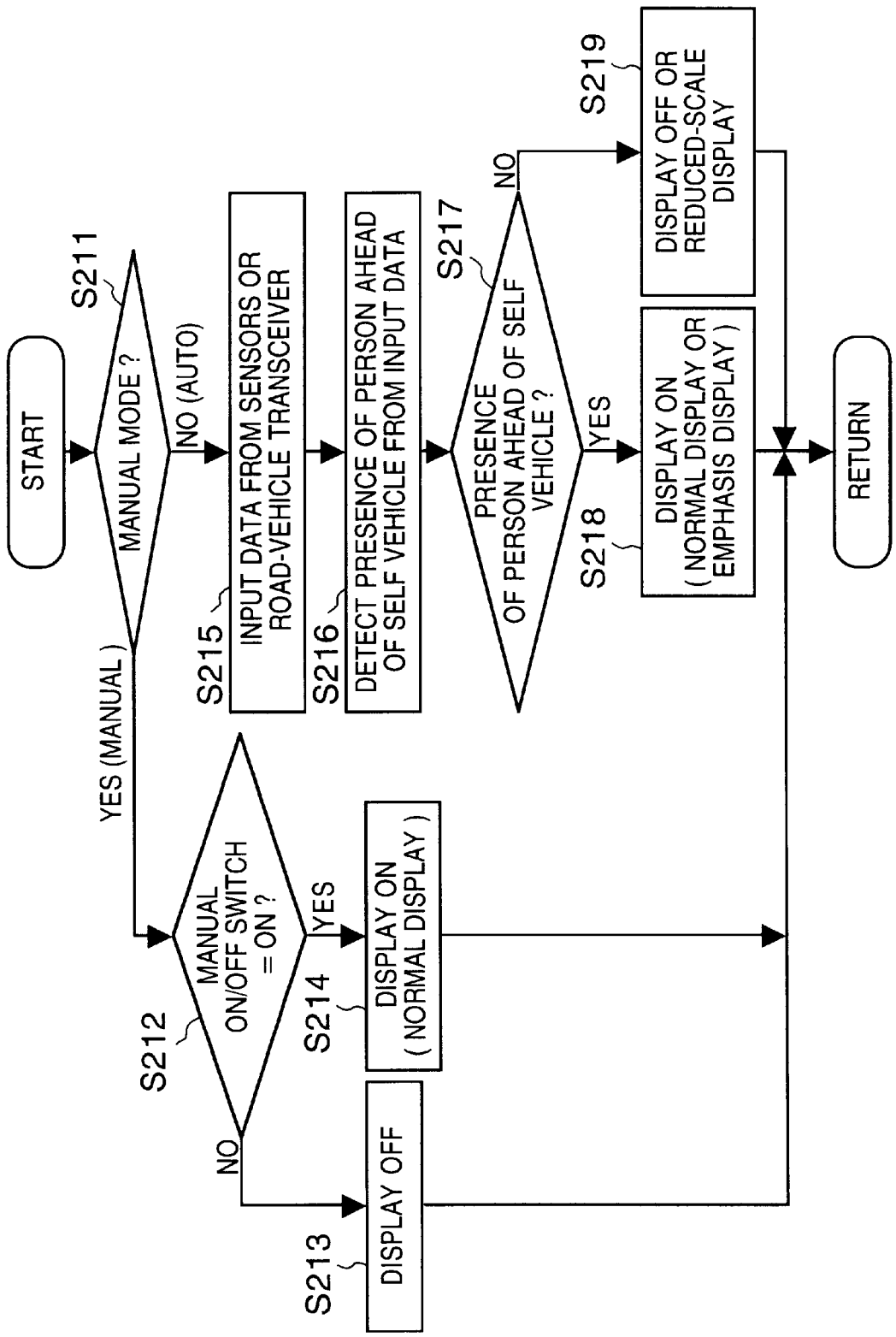
FIG. 19 is a flow chart showing a display control process by a display apparatus on a vehicle according to the fourth embodiment of the present invention.

FIG. 19 is a flow chart showing the display control process done by the display apparatus on a vehicle according to the fourth embodiment, i.e., showing the sequence of software executed by the CPU 1101 while the ignition switch of the self vehicle is ON and the power switch 111 is ON.

In FIG. 19, the processes in steps S211 to S214, step S218, and step S219 are the same as those in steps S201 to S204, step S207, and step S208 in the third embodiment (FIG. 18).

Step S215: Data corresponding to the output signals from the respective sensors that have been explained with reference to FIG. 17, or data corresponding to a reception signal of the road-vehicle transceiver 106 is loaded.

Step S216: A detection process for detecting if a person is present ahead of the self vehicle is done on the basis of the data loaded in step S215. An example of the method of detecting if a person is present ahead of the vehicle will be explained below.

(1) When sensor output signals are used: Data corresponding to the output signals from the steering angle sensor 110 and vehicle velocity sensor 115 are loaded, the traveling route of the self vehicle (a route along which the self vehicle is expected to travel) is computed by a known method, and it is checked if a person detected by the obstacle sensor 102 on the computed traveling route is moving in a direction perpendicular to the traveling route.

Note that the method of estimating the traveling route is known to those who are skilled in the art by preceding Japanese Patent Laid-Open No. H10-100820 of the present applicant, and a detailed description thereof will be omitted in this embodiment.

Also, as for determination as to whether an obstacle detected by the obstacle sensor 102 is a person or another obstacle such as a guardrail or the like, when the moving velocity (crossing velocity) of the detected obstacle with respect to the traveling route of the self vehicle has exceeded a predetermined threshold value, and variations of detection results (distances) to a plurality of points detected by the obstacle sensor 102 as measurement points on the obstacle in the widthwise direction of the vehicle (a direction perpendicular to the traveling route) are smaller than a predetermined value, it is determined that the detected obstacle is a person; otherwise, another obstacle.

(2) When reception signal of road-vehicle transceiver is used: The road is scanned by a sensor such as a camera or the like equipped near the road using a function provided to the road side. When an object having a different size, moving velocity, or moving direction from that of a vehicle that is traveling on the road is detected by that scan, it is determined that the object is a person, and a signal indicating this is sent from a transmitter disposed near the road. On the other hand, in the vehicle, whether or not a person is present ahead of the vehicle can be recognized by receiving the signal sent from the transmitter by the road-vehicle transceiver 106.

Step S217: If YES is determined as the result of the detection process in step S216 (a person is detected ahead of the vehicle), the flow advances to step S218 to make normal or emphasis display; if NO in step S217 (no person is detected ahead of the vehicle), the flow advances to step S219 to stop display or to make reduced-scale display.

As described above, according to this embodiment, when no person is detected ahead of the vehicle, since display of an image sensed by the infrared light camera 103 is restricted (display of the sensed image is stopped or the sensed image is displayed in the reduced scale), the load on the driver's sight can be reduced. On the other hand, when a person is detected ahead of the vehicle, since restriction of the display pattern is canceled, normal or emphasis display is made. Hence, the driver's sight can be adequately supported in correspondence with the surrounding environment.

[Fifth Embodiment]

The fifth embodiment based on the display apparatus on a vehicle according to the third embodiment mentioned above will be explained below. In the following description, a repetitive explanation of the same arrangement as in the third embodiment will be omitted, and only characteristic features of this embodiment will be mainly explained.

Figure 20:
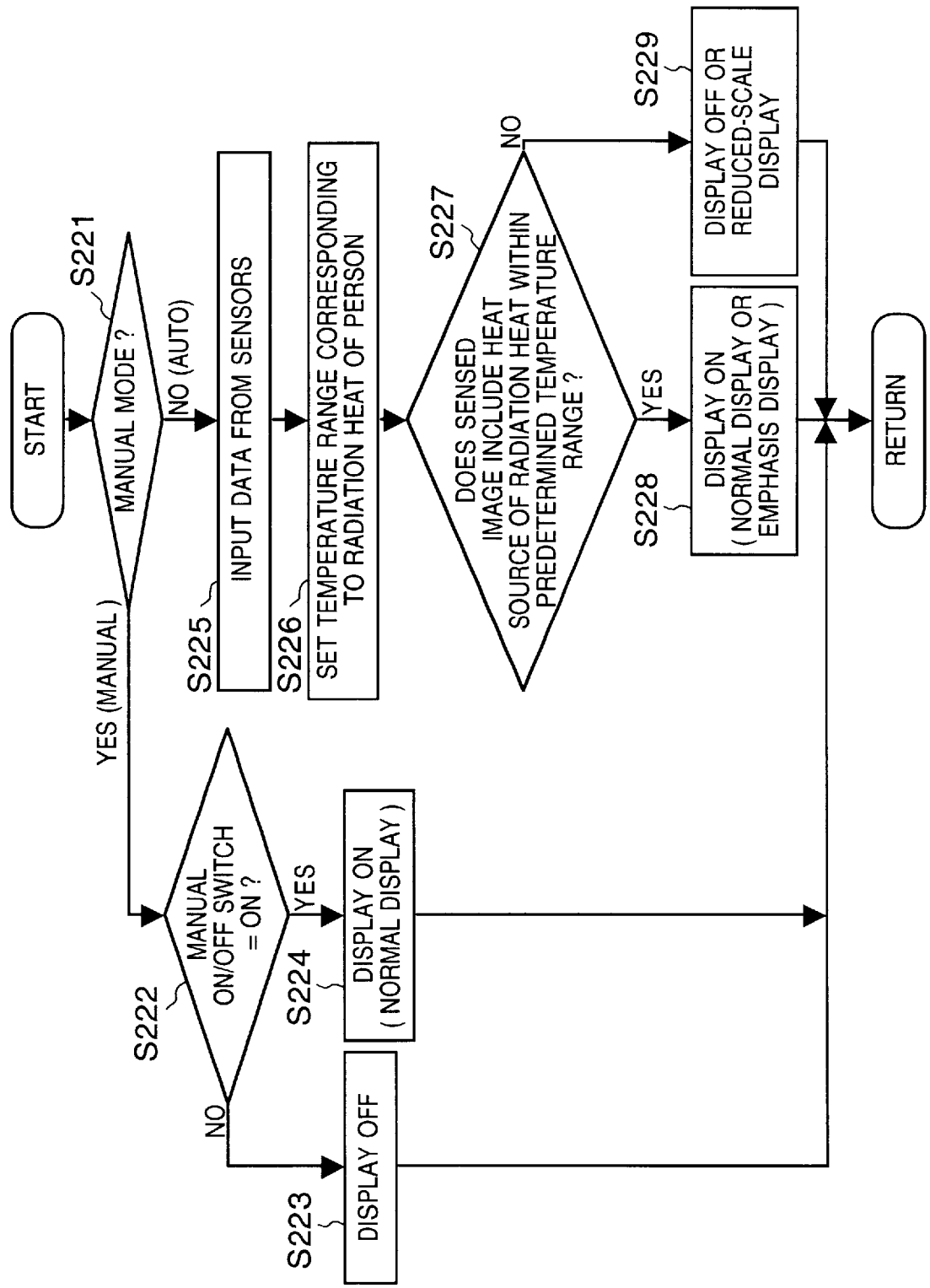
FIG. 20 is a flow chart showing a display control process by a display apparatus on a vehicle according to the fifth embodiment of the present invention.

FIG. 20 is a flow chart showing the display control process done by the display apparatus on a vehicle according to the fifth embodiment, i.e., showing the sequence of software executed by the CPU 1101 while the ignition switch of the self vehicle is ON and the power switch 111 is ON.

In FIG. 20, the processes in steps S221 to S224, step S228, and step S229 are the same as those in steps S201 to S204, step S207, and step S208 in the third embodiment (FIG. 18).

Step S225: Data corresponding to the output signals from the respective sensors that have been explained with reference to FIG. 17 are loaded.

Step S226: A temperature range corresponding to radiation heat of a person is set. Heat radiated by a person normally falls within a given temperature range, which changes in correspondence with atmospheric temperature. In this step, the temperature range of radiation heat of a person, which is pre-stored in the ROM 1103 as a basic value, is set in accordance with atmospheric temperature detected by the atmospheric temperature sensor 107, and the set basic value is corrected in accordance with date & time information that can be detected by the GPS sensor 105 (for example, the basic value is corrected to be relatively lower in winter or higher in summer, and is also corrected to be relatively higher in a time band around 2:00 p.m. at which the highest atmospheric temperature is normally recorded than other time bands).

Step S227: It is checked if a heat source within the temperature range set in step S226 is included in the sensed image of the infrared light camera 103. If YES in step S227 (a heat source corresponding to a person is detected), the flow advances to step S228 to make normal or emphasis display; if NO in step S227 (no heat source corresponding to a person is detected), the flow advances to step S229 to stop display or to make reduced-scale display.

As described above, according to this embodiment, the presence/absence of a person ahead of the self vehicle is determined by checking if radiation heat of a person is detected, and when it is determined as a result of checking that no person is present ahead of the vehicle, since display of an image sensed by the infrared light camera 103 is restricted (display of the sensed image is stopped or the sensed image is displayed in the reduced scale), the load on the driver's sight can be reduced. On the other hand, when a person is detected ahead of the vehicle, since restriction of the display pattern is canceled, normal or emphasis display is made. Hence, the driver's sight can be adequately supported in correspondence with the surrounding environment.

[Sixth Embodiment]

The sixth embodiment based on the display apparatus on a vehicle according to the third embodiment mentioned above will be explained below. In the following description, a repetitive explanation of the same arrangement as in the third embodiment will be omitted, and only characteristic features of this embodiment will be mainly explained.

Figure 21:
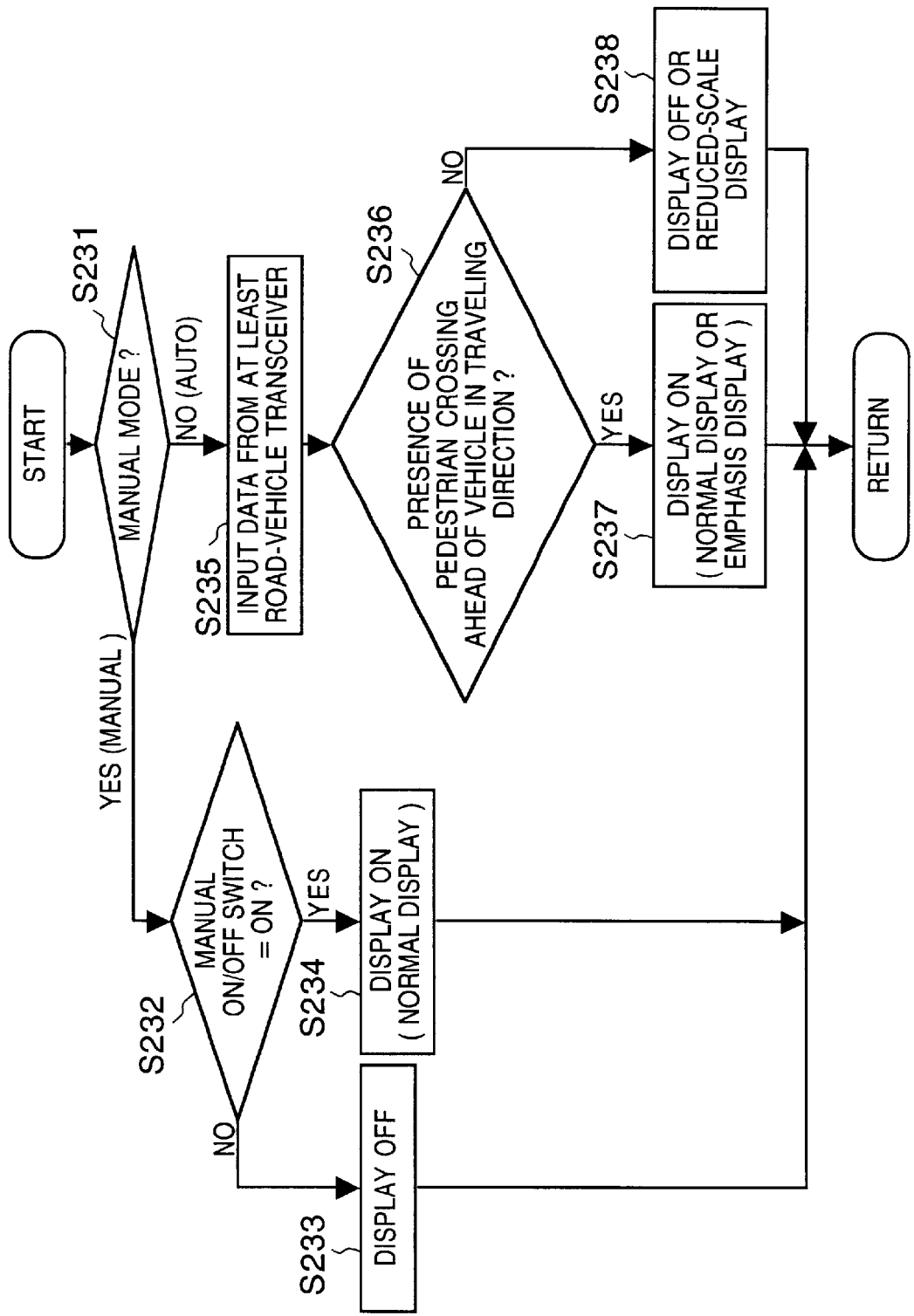
FIG. 21 is a flow chart showing a display control process by a display apparatus on a vehicle according to the sixth embodiment of the present invention.

FIG. 21 is a flow chart showing the display control process done by the display apparatus on a vehicle according to the sixth embodiment, i.e., showing the sequence of software executed by the CPU 1101 while the ignition switch of the self vehicle is ON and the power switch 111 is ON.

In FIG. 21, the processes in steps S231 to S234, step S237, and step S238 are the same as those in steps S201 to S204, step S207, and step S208 in the third embodiment (FIG. 18).

Step S235: At least data corresponding to a reception signal of the road-vehicle transceiver 106 is loaded. Also, for more practical processes to be described later, data corresponding to the output signals from the respective sensors that have been explained above with reference to FIG. 17 are preferably loaded.

Step S236: It is checked if the data corresponding to the reception signal of the road-vehicle transceiver 106 loaded in step S235 includes data that indicates the presence of a pedestrian crossing. If YES in step S236 (a pedestrian crossing is detected), the flow advances to step S237 to make normal or emphasis display; if NO in step S236 (no pedestrian crossing is detected), the flow advances to step S238 to stop display or to make reduced-scale display.

If the road-vehicle transceiver 106 is set to receive an external signal, normal or emphasis display is made in step S237 even when the pedestrian crossing behind the self vehicle or around 1 km ahead of the self vehicle is detected in step S236, and the driver may feel confused.

As a preferred embodiment that can solve the aforementioned problem, when the presence of a pedestrian crossing is determined based on the reception signal of the road-vehicle transceiver 106, the current position of the self vehicle is detected by a known method on the basis of data corresponding to the output signal from the GPS sensor 105, it is then checked if the pedestrian crossing is present ahead of or behind the detected current position, and if it is determined that the pedestrian crossing is present ahead of the current position, a distance D between the current position and the position of the pedestrian crossing is computed. At this time, the direction ahead of the detected current position of the self vehicle can be determined based on a route guidance path that can be acquired from a navigation unit (not shown) or data of, e.g., a traveling route which can be computed based on the vehicle velocity detected by the vehicle velocity sensor 115 and the steering angle detected by the steering angle sensor 110. The computed distance D is compared with a predetermined distance DP. If the distance D is smaller than the predetermined distance PD, normal or emphasis display is made in step S237. If the distance D is larger than the predetermined distance DP, display of the sensed image may be stopped or the sensed image may be displayed in a reduced scale in step S238. In this case, the predetermined distance DP is preferably set in accordance with the vehicle velocity detected by the vehicle velocity sensor 115 (that is, a larger predetermined distance DP is set with increasing vehicle velocity).

As described above, according to this embodiment, it is checked if a pedestrian crossing is present ahead of the self vehicle, and if no pedestrian crossing is present as a result of checking, since display of an image sensed by the infrared light camera 103 is restricted (display of the sensed image is stopped or the sensed image is displayed in a reduced scale), the load on the driver's sight can be reduced. On the other hand, if a pedestrian crossing is present, restriction of the display pattern is canceled to allow the driver to easily recognize a pedestrian who is crossing that pedestrian crossing, and normal or emphasis display is made. Hence, the driver's sight can be adequately supported in correspondence with the surrounding environment.

[Seventh Embodiment]

The seventh embodiment based on the display apparatus on a vehicle according to the third embodiment mentioned above will be explained below. In the following description, a repetitive explanation of the same arrangement as in the third embodiment will be omitted, and only characteristic features of this embodiment will be mainly explained.

Figure 22:
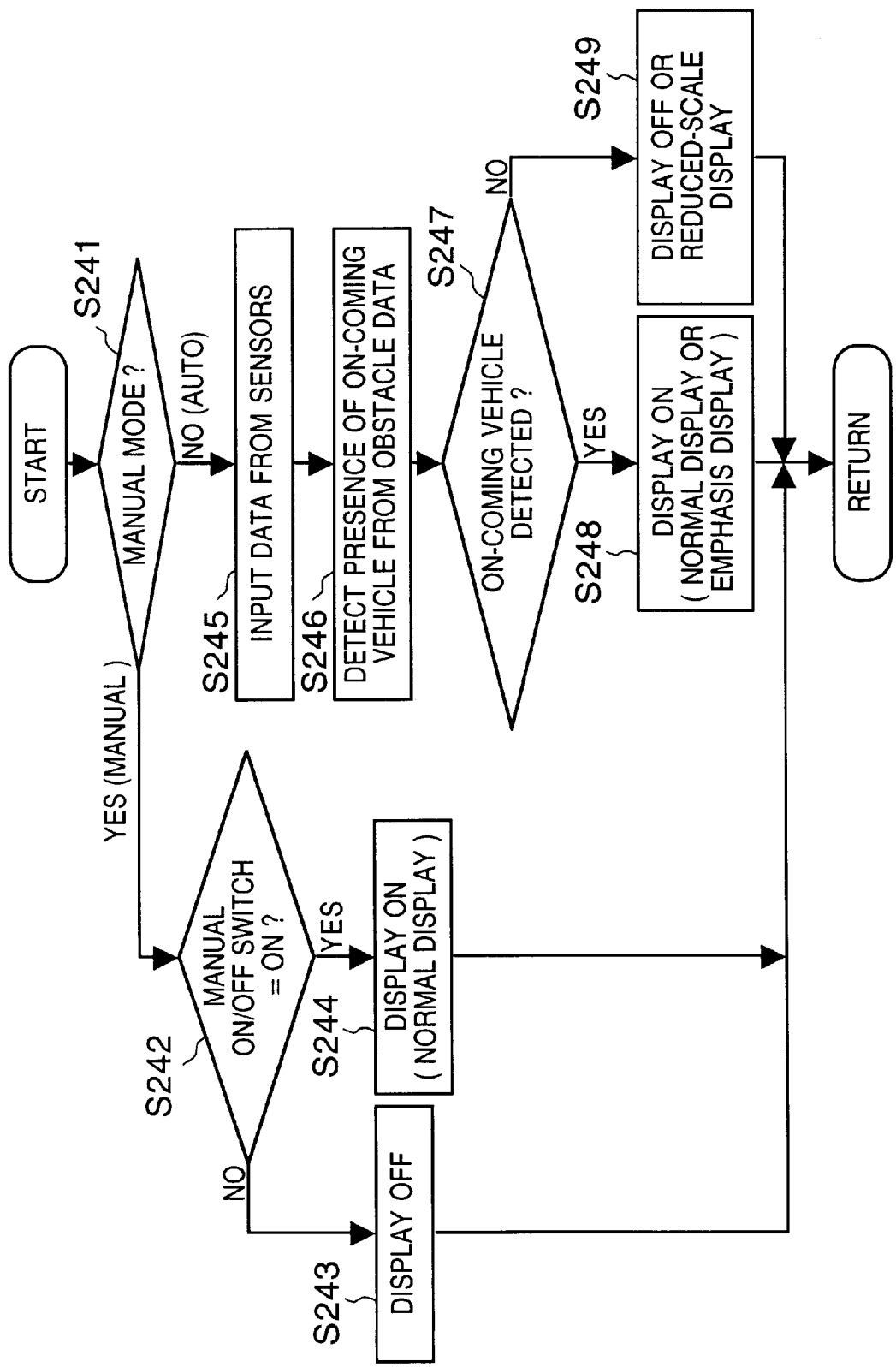
FIG. 22 is a flow chart showing a display control process by a display apparatus on a vehicle according to the seventh embodiment of the present invention.

FIG. 22 is a flow chart showing the display control process done by the display apparatus on a vehicle according to the seventh embodiment, i.e., showing the sequence of software executed by the CPU 1101 while the ignition switch of the self vehicle is ON and the power switch 111 is ON.

In FIG. 22, the processes in steps S241 to S244, step S248, and step S249 are the same as those in steps S201 to S204, step S207, and step S208 in the third embodiment (FIG. 18).

Step S245: Data corresponding to the output signals from the respective sensors that have been explained with reference to FIG. 17 are loaded.

Step S246: A relative velocity between the self vehicle and an obstacle detected by the obstacle sensor 102 is computed on the basis of data corresponding to the output signals from the vehicle velocity sensor 115 and obstacle sensor 102 of those loaded in step S245, and if the computed relative velocity indicates a direction in which the self vehicle and the obstacle approach each other, and is larger than a predetermined value, it is determined that the obstacle is an on-coming vehicle.

Step S247: If it is determined in step S246 that the obstacle detected by the obstacle sensor 102 is an on-coming vehicle, the flow advances to step S248 to make normal or emphasis display; if it is determined in step S246 that the obstacle is not an on-coming vehicle, the flow advances to step S249 to stop display or to make reduced-scale display.

As described above, according to this embodiment, when an obstacle is detected by the obstacle sensor 102, it is checked if the obstacle and the self vehicle are approaching each other at a velocity higher than a predetermined relative velocity. As a result of checking, if the approaching velocity is lower than the predetermined relative velocity, or if the obstacle is moving away from the self vehicle, since the object is not recognized as an on-coming vehicle and display of an image sensed by the infrared light camera 103 is restricted (display of the sensed image is stopped or the sensed image is displayed in a reduced scale), the load on the driver's sight can be reduced. On the other hand, if the obstacle is recognized as an on-coming vehicle since the approaching velocity is higher than the predetermined relative velocity, restriction of the display pattern is canceled to allow the driver to easily recognize that on-coming vehicle, and normal or emphasis display is made. Hence, the driver's sight can be adequately supported in correspondence with the surrounding environment.

As described above, according to the aforementioned embodiments, a display apparatus on a vehicle, which can satisfactorily display the situation around the vehicle, and can change its display pattern in correspondence with the surrounding environment, can be provided.

As many apparently widely different embodiments of the present invention can be made without departing from the spirit and scope thereof, it is to be understood that the invention is not limited to the specific embodiments thereof except as defined in the appended claims.

What is claimed is:

1. A display apparatus on a vehicle, which comprises image sensing means for sensing an image ahead of the vehicle using infrared rays, and display means for displaying an infrared image sensed by said image sensing means at a position in front of a driver's seat in a passenger room of the vehicle, the apparatus comprising:

surrounding environment detection means for detecting a surrounding environment of the vehicle arranged to determine a presence of a heat source that may interfere with safe maneuvering; and display control means for controlling said display means on the basis of a detection result of said surrounding environment detection means, wherein, when it is determined that the presence of a heat source that will interfere with safe maneuvering is absent ahead of the vehicle and the vehicle trails, in response to operation of a trail controller operable for automatically controlling the vehicle without intervention by the vehicle driver, the path of another vehicle so as to maintain a distance from the other vehicle at a predetermined value, said display control means suppresses display of the entire infrared image on said display means, and wherein, when it is determined that the vehicle is traveling trailing the path of the other vehicle and the predetermined value is set to be smaller than a headlight irradiation range of the vehicle, said display control means suppresses display of the infrared image on said display means compared to a case wherein the predetermined value is set to be larger than the headlight irradiation range.

2. The apparatus according to claim 1, wherein said display control means inhibits display of the infrared image as suppression of display of the infrared image on said display means.

3. The apparatus according to claim 1, wherein said display control means suppresses display of the infrared image on said display means by decreasing a display luminance of said display means.

4. The apparatus according to claim 1, wherein said display control means suppresses display of the infrared image on said display means by decreasing size of a display area of said display means.

5. The apparatus according to claim 1, wherein when the predetermined value is smaller than a threshold value set in accordance with a traveling velocity of the vehicle, said display control means suppresses display of the infrared image on said display means compared to a case wherein the predetermined distance is larger than the threshold value.

6. The apparatus according to claim 5, wherein the threshold value is set to increase in accordance with increasing traveling velocity of the vehicle.

* * * * *

UNITED STATES PATENT AND TRADEMARK OFFICE
CERTIFICATE OF CORRECTION

PATENT NO.   : 6,538,622 B1  
DATED        : March 25, 2003  
INVENTOR(S)  : Koichi Kojima et al.

It is certified that error appears in the above-identified patent and that said Letters Patent is hereby corrected as shown below:

<u>Title page,</u>
Item [30], Foreign Application Priority Data, replace "Jul. 9, 1999" with -- September 7, 1999 --.

Signed and Sealed this

Nineteenth Day of August, 2003

JAMES E. ROGAN
*Director of the United States Patent and Trademark Office*